(12) United States Patent
Karimi-Shirazia

(10) Patent No.: US 10,991,193 B2
(45) Date of Patent: Apr. 27, 2021

(54) VENDING MACHINE FOR DISPENSING HEATED GRANULAR FOODSTUFFS

(71) Applicant: Ali Karimi-Shirazia, Ottawa (CA)

(72) Inventor: Ali Karimi-Shirazia, Ottawa (CA)

( * ) Notice: Subject to any disclaimer, the term of this patent is extended or adjusted under 35 U.S.C. 154(b) by 84 days.

(21) Appl. No.: 16/362,044

(22) Filed: Mar. 22, 2019

(65) Prior Publication Data

US 2019/0318566 A1  Oct. 17, 2019

Related U.S. Application Data

(63) Continuation of application No. PCT/CA2017/051115, filed on Sep. 22, 2017.

(60) Provisional application No. 62/398,235, filed on Sep. 22, 2016, provisional application No. 62/541,175, filed on Aug. 4, 2017.

(51) Int. Cl.
*G07F 11/44* (2006.01)
*G05B 19/042* (2006.01)

(52) U.S. Cl.
CPC ............ G07F 11/44 (2013.01); G05B 19/042 (2013.01); *G05B 2219/2645* (2013.01)

(58) Field of Classification Search
CPC .................. G07F 11/44; G05B 19/042; G05B 2219/2645
USPC .................................................. 700/231–244
See application file for complete search history.

(56) References Cited

U.S. PATENT DOCUMENTS

| | | | |
|---|---|---|---|
| 3,078,782 A | 2/1963 | Carpenter | |
| 3,253,532 A * | 5/1966 | Jones | A47J 37/047 99/323.7 |
| 3,641,916 A | 2/1972 | Hildebrand | |
| 3,812,774 A * | 5/1974 | Day | A23L 7/187 99/323.8 |
| 4,171,667 A | 10/1979 | Miller et al. | |
| 4,838,455 A | 6/1989 | Hoeberigs | |
| 5,404,797 A * | 4/1995 | Millar | A47J 37/1228 221/150 HC |
| 5,657,684 A * | 8/1997 | Chaikowsky | G07F 17/0078 99/323.7 |
| 6,000,318 A * | 12/1999 | Weiss | G07F 17/0078 99/323.5 |

(Continued)

FOREIGN PATENT DOCUMENTS

| | | |
|---|---|---|
| CN | 2765529 Y | 3/2006 |
| CN | 202331643 U | 7/2012 |

(Continued)

*Primary Examiner* — Michael Collins
(74) *Attorney, Agent, or Firm* — Bereskin & Parr LLP; Carmela De Luca

(57) ABSTRACT

A vending machine for dispensing heated granular foodstuffs includes a receptacle dispensing assembly for dispensing a receptacle into a receiving zone. A cooled storage hopper stores granular foodstuffs, and has an open bottom end. A discharge assembly is in communication with the open bottom end for transporting the quantity of the granular foodstuffs away from the cooled storage hopper. A heating assembly receives the quantity of the granular foodstuffs from the discharge assembly, heats the quantity of the granular foodstuffs with a heating fluid, and dispenses the quantity of the granular foodstuffs into the receptacle in the receiving zone. A heating fluid generator supplies heating fluid to the heating assembly. A condiment dispenser dispenses at least one condiment into the receptacle in the receiving zone.

20 Claims, 22 Drawing Sheets

(56) References Cited

U.S. PATENT DOCUMENTS

| | | | |
|---|---|---|---|
| 6,187,353 B1 * | 2/2001 | Wyman | G07F 17/0078 426/233 |
| 6,234,063 B1 * | 5/2001 | Evers | G07F 17/0078 99/323.7 |
| 6,460,451 B1 * | 10/2002 | Helman | A23L 7/187 99/323.5 |
| 6,498,329 B1 * | 12/2002 | Gibernau | G07F 9/105 219/753 |
| 7,721,556 B2 * | 5/2010 | Guida | B65D 81/3484 62/4 |
| 8,464,634 B2 * | 6/2013 | Cretors | A23L 7/187 99/323.8 |
| 9,955,713 B2 * | 5/2018 | Rhome | A23L 7/187 |
| 2006/0288876 A1 | 12/2006 | Berger et al. | |
| 2012/0093996 A1 | 4/2012 | Martin et al. | |
| 2013/0226338 A1 * | 8/2013 | Pickett | G07F 13/10 700/235 |
| 2014/0255569 A1 | 9/2014 | Jacobsen et al. | |
| 2016/0253861 A1 | 9/2016 | Seo | |

FOREIGN PATENT DOCUMENTS

| | | |
|---|---|---|
| CN | 204229522 U | 3/2015 |
| CN | 204926298 U | 12/2015 |
| FR | 2593055 | 7/1987 |
| FR | 2667763 A1 | 4/1992 |
| FR | 2689731 A1 | 10/1993 |
| JP | 2010231678 | 10/2010 |
| KR | 1020010065544 A | 7/2001 |
| KR | 2020030019791 | 9/2003 |
| KR | 1020060090364 | 8/2006 |
| KR | 1020060105176 A | 10/2006 |
| KR | 100804505 B1 | 2/2008 |
| KR | 1020110118027 A | 10/2011 |
| RU | 90896 | 1/2010 |
| WO | 2016006736 | 1/2016 |

* cited by examiner

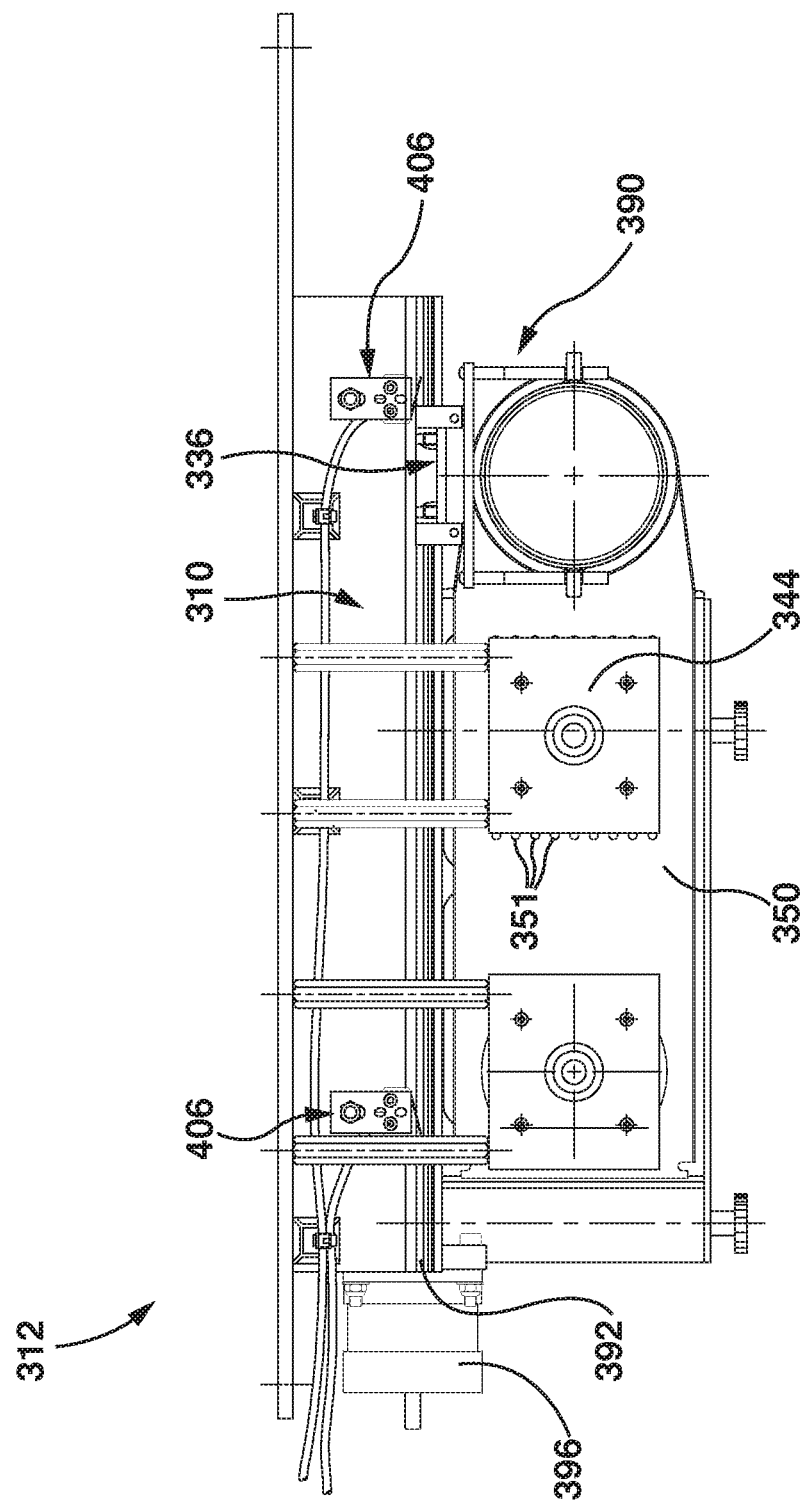

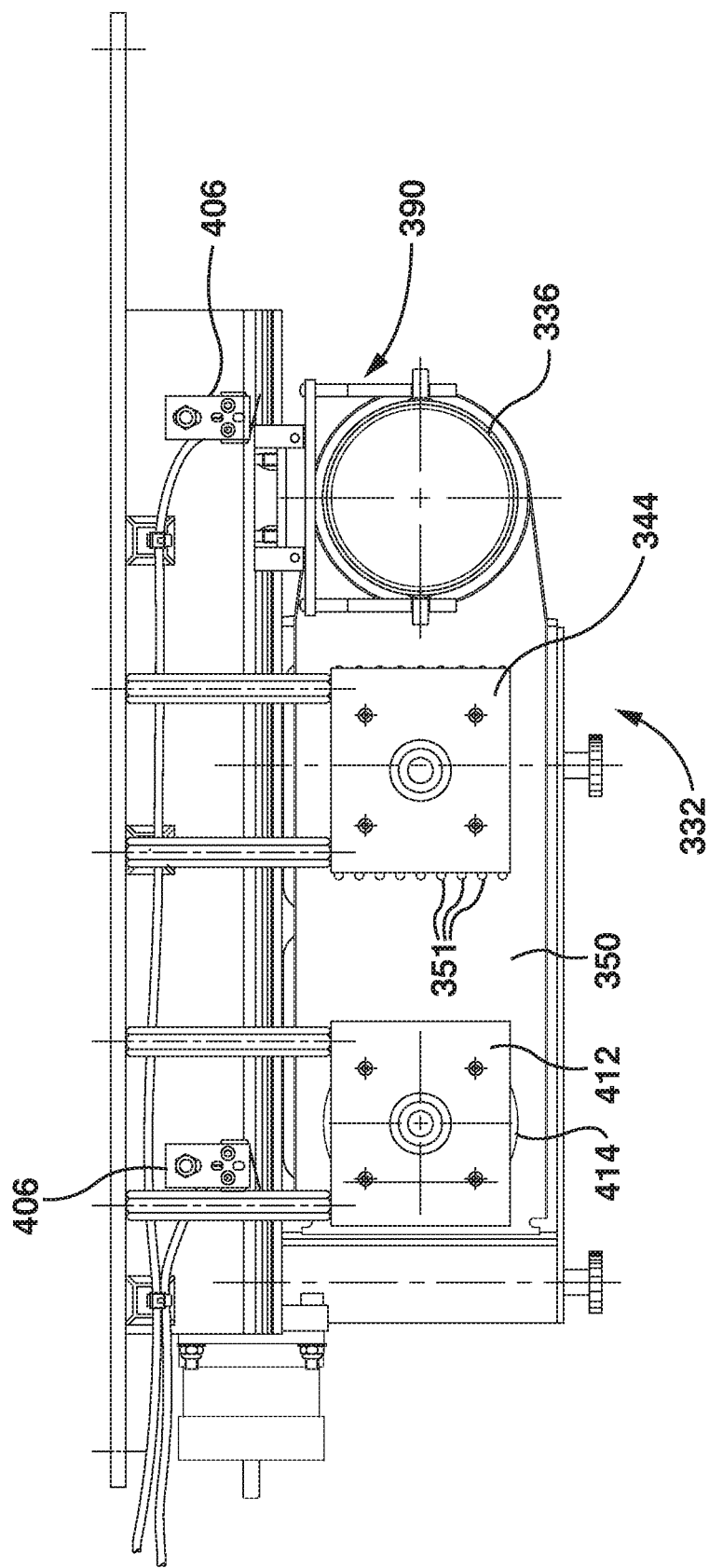

VENDING MACHINE FOR DISPENSING HEATED GRANULAR FOODSTUFFS

CROSS-REFERENCE TO RELATED APPLICATIONS

This is a continuation application of International Application No. PCT/CA2017/051115, filed on Sep. 22, 2017, and claims the benefit of 35 U.S.C. § 119 and/or 120 based on the priority of U.S. Provisional Application 62/398,235 filed Sep. 22, 2016 and entitled VENDING MACHINE FOR DISPENSING HEATED GRANULAR FOODSTUFFS, and U.S. Provisional Application 62/541,175 filed Aug. 4, 2017 and entitled VENDING MACHINE FOR DISPENSING HEATED GRANULAR FOODSTUFFS, each of these applications being incorporated herein in their entirety by reference.

FIELD

The disclosure relates to vending machines. More specifically, the disclosure relates to vending machines that dispense heated granular foodstuffs, such as heated corn kernels.

BACKGROUND

U.S. Pat. No. 4,171,667 (Miller et al.) discloses a popcorn vending apparatus that includes a hot air cooker assembly, an elevator type supply assembly for furnishing raw kernels to the cooker, a cup dispenser, a dispenser including a pump for withdrawing butter flavoring from its original container and dispensing to the vended container of popcorn, and a salt dispenser for delivering tubes of salt to the purchaser. The cooker includes a transparent receptacle tiltable from a cooking position to a dispensing position. A chute assembly for delivering both the cups and cooked popcorn to a delivery station includes means for preventing unauthorized access to the interior of the apparatus housing.

U.S. Pat. No. 5,657,684 (Chaikowsky) discloses a popcorn vending apparatus that includes a cup dispenser for dispensing a cup in an area accessible by a purchaser, a cooker assembly for cooking corn kernels and dispensing the cooked kernels to a cup in the purchaser accessible area, and a corn dispenser for dispensing a measured quantity of corn to the cooker. The dispenser includes a hopper and a transporting mechanism for transporting measured quantities of corn from the hopper to the cooker. The transport mechanism includes a tubular member and a rotatable open spiral in the tubular member. The transporting mechanism includes a precision drive which is capable of rotating the open spiral a predetermined number of revolutions. There is also a flavor dispenser for dispensing flavoring in a cup in the purchaser accessible area. The flavor dispenser includes a dispensing head and a support for moving the head over a cup in the dispensing area.

SUMMARY

The following summary is intended to introduce the reader to various aspects of the disclosure, but not to define or delimit any invention.

According to some aspects, a vending machine for dispensing heated granular foodstuffs includes a cooled storage hopper for storing granular foodstuffs, a receptacle dispensing assembly for dispensing a receptacle into a receiving zone, and a heating assembly for heating a quantity of the granular foodstuffs received from the cooled storage hopper and dispensing the quantity of the granular foodstuffs into the receptacle in the receiving zone.

The vending machine may further include a discharge assembly for transporting the quantity of the granular foodstuffs from the cooled storage hopper to the heating assembly. The cooled storage hopper may include an open bottom end, and the discharge assembly may be in communication with the open bottom end.

The discharge assembly may include a discharge chamber adjacent the open bottom end, and a discharge actuator in the discharge chamber. The discharge actuator may include a discharge pocket having a discharge pocket top opening and a discharge pocket bottom opening.

The discharge assembly may further include a first chute laterally spaced from the open bottom end. The discharge actuator may be laterally slideable in the discharge chamber between a first position wherein the discharge pocket is aligned with the open bottom end and a second position wherein the discharge pocket is aligned with the first chute.

The discharge pocket may define the quantity of the granular foodstuffs.

The discharge actuator may block the open bottom end when the discharge actuator is in the second position.

The heating assembly may include a heating chamber below the first chute. A second chute may be in communication with the heating chamber and laterally spaced from the first chute. A heating fluid inlet may be in the heating chamber between the first chute and the second chute. A heating actuator may be in the heating chamber.

The heating actuator may include a heating pocket having a heating pocket top opening for receiving the quantity of granular foodstuffs from the first chute, and a heating pocket bottom opening for dispensing the quantity of granular foodstuffs into the second chute.

The heating actuator may be laterally slideable in the heating chamber amongst a first position wherein the heating pocket top opening is aligned with the first chute, a second position wherein the heating pocket is aligned with the heating fluid inlet, and a third position wherein the heating pocket bottom opening is aligned with the second chute.

The second chute may be vertically aligned with the receiving zone.

The heating assembly may include a heating vessel vertically aligned with the first chute. The heating vessel may have a heating fluid inlet. The heating vessel may have a heating vessel openable bottom. The heating vessel openable bottom may be vertically aligned with the receiving zone.

The heating fluid inlet may be a steam inlet. The vending machine may further comprise a steam generator for supplying steam to the steam inlet.

The vending machine may further comprise a drain assembly for draining the heating fluid from the heating assembly.

The cooled storage hopper may be housed within a refrigerated compartment.

The vending machine may further include a condiment dispenser for dispensing at least one condiment into the receptacle in the receiving zone.

According to some aspects, a method for dispensing heated granular foodstuffs includes: a) cooling granular foodstuffs; b) dispensing a receptacle into a receiving zone; c) discharging a quantity of the cooled granular foodstuffs;

d) heating the quantity of the cooled granular foodstuffs; and
e) dispensing the quantity of the heated granular foodstuffs into the receptacle in the receiving zone.

The granular foodstuffs may include kernels of corn.

Step d) may comprise applying a heating fluid to the cooled granular foodstuffs. The heating fluid may be hot water or steam.

The method may further include draining the heating fluid from the heated granular foodstuffs.

The method may further include applying a condiment to the receptacle in the receiving zone.

According to some aspects, a vending machine for dispensing heated granular foodstuffs includes a receptacle dispensing assembly for dispensing a receptacle into a receiving zone, and cooled storage hopper for storing granular foodstuffs. The cooled storage hopper has an open bottom end. A discharge assembly is in communication with the open bottom end for transporting a quantity of the granular foodstuffs away from the cooled storage hopper. A heating assembly receives the quantity of the granular foodstuffs from the discharge assembly, heats the quantity of the granular foodstuffs with a heating fluid, and dispenses the quantity of the granular foodstuffs into the receptacle in the receiving zone. A heating fluid generator supplies heating fluid to the heating assembly. A condiment dispenser dispenses at least one condiment into the receptacle in the receiving zone.

In accordance with another aspect of the teachings described herein, a vending machine for dispensing heated granular foodstuffs to a customer may include a cooled storage hopper for storing granular foodstuffs. A discharge assembly may be configured to dispense a first quantity of granular foodstuffs from the storage hopper. A heating assembly may be provided to receive the first quantity of granular foodstuffs from the discharge assembly and to heat the first quantity of granular foodstuffs to a serving temperature. A receptacle transport unit may be configured to receive a receptacle, transport the receptacle to the heating assembly to receive the first quantity of granular foodstuffs, and transport the receptacle containing the first quantity of granular foodstuffs to a delivery station whereby the receptacle containing the first quantity of the granular foodstuffs is accessible to a customer.

The vending machine may also include a condiment dispenser operable to dispense at least one condiment onto the first quantity of granular foodstuffs contained in the receptacle, and wherein the receptacle transport unit is operable to transport the receptacle containing the first quantity of granular foodstuffs from the heating assembly to the condiment dispenser to receive the at least one condiment prior and then to transport the receptacle containing the first quantity of granular foodstuffs to the delivery station.

The vending machine may also include a first condiment container for storing a first condiment and in communication with a first condiment outlet for dispensing the first condiment, and a second condiment container a second condiment that is different than the first condiment and in communication with a second condiment outlet.

The first condiment container may be maintained at a first temperature and the second condiment container may be maintained at a different, second temperature.

The receptacle containing the first quantity of granular foodstuffs may be positionable beneath the first condiment outlet and the second condiment outlet to simultaneously receive the first condiment and the second condiment.

The condiment dispenser may also include a first condiment application station comprising the first condiment outlet and a second condiment application station spaced apart from the first condiment station and comprising the second condiment outlet. The receptacle transport unit may be operable to move the receptacle containing the first quantity of the granular foodstuffs to the first condiment station to receive the first condiment from the first condiment outlet and to the second condiment station to receive the second condiment from the second condiment outlet. When the receptacle is in the second condiment station it may be spaced apart from the first condiment outlet and cannot receive the first condiment.

The heating assembly may include a heating pot having a top opening configured to receive the first quantity of granular foodstuffs from the discharge, a sidewall extending axially from the top opening and an opposing bottom opening. A porous bottom wall may be positionable to cover the bottom opening in the heating pot to retain the first quantity of granular foodstuffs within the heating pot. A heating fluid applicator may dispense a flow of heating fluid into the heating pot whereby the first quantity of granular foodstuffs is heated by the flowing heating fluid. The heating fluid may exit via the bottom opening and travels through the porous bottom wall to a drain.

The first quantity of granular foodstuffs may be heated to the serving temperature by the flowing heating fluid.

A bottom door may be closeable to block the lower opening to retain the heating fluid and openable to permit the heating fluid to exit via the bottom opening.

The heating fluid applicator may include a spray nozzle configured to spray the flow of heating fluid into the top opening of the heating pot.

The heating fluid applicator may include at least a first inlet port provided in the sidewall of the heating pot and spaced axially between the top opening and bottom opening, through which the heating fluid can be introduced into the heating pot.

The heating assembly may also include at least one internal sprayer extending inwardly from the first inlet port inside the heating pot and positioned so as to be surrounded by the first quantity of granular foodstuffs when in use, the internal sprayer including a plurality of outlet holes to dispense the heating fluid within the heating pot.

The heating pot may be movable between: a first position, in which the top opening underlies an outlet of the discharge assembly to receive the first quantity of granular foodstuffs; a second position, in which the heating pot can receive the flow of heating fluid and the bottom opening overlies the porous bottom wall, and a third position, in which the bottom opening is spaced apart from the bottom wall and overlies the receptacle whereby the first quantity of granular foodstuffs that has been heated is transferred from the heating pot to the receptacle.

The heating assembly may also include a washing station that is operable to wash the heating pot between uses with a washing liquid. The heating pot is movable from the third position to a fourth position in the washing station to be washed, and then from the fourth position to the first position to receive a second quantity of the granular foodstuffs.

A drip tray may extend beneath at least the washing station and the second position to receive the heating fluid exiting the heating pot via the bottom opening and used washing liquid.

The first position may be laterally intermediate the second position and the washing station.

The heating pot may be removable.

The heating fluid may include at least one of steam and liquid water.

The vending machine may include at least one of an onboard water supply tank to provide water to the heating assembly, and an onboard outlet holding tank to receive used water exiting the heating assembly.

A water recycling apparatus may be configured to receive at least a portion of used water exiting the heating assembly and redirect the portion of used water to the heating unit to be used for a second time.

The cooled storage hopper may include at least one of a refrigerator to store the granular foodstuffs at or below about 4 degrees Celsius and a freezer to store the granular foodstuffs at or below about −18 degrees Celsius.

The cooled storage hopper may be provided at a higher elevation than the heating assembly, whereby the first quantity of granular foodstuffs can be conveyed from the cooled storage hopper to the heating assembly via gravity.

The cooled storage hopper may removable.

A receptacle dispensing assembly for dispensing a receptacle may be operable to provide an empty receptacle to the receptacle transport apparatus.

In accordance with another broad aspect of the teachings described herein, a method for dispensing heated granular foodstuffs from a vending machine may include the steps of a) dispensing a first quantity of granular food stuffs from a hopper in response to an input from a customer, the granular food stuffs being a storage temperature, b) heating the first quantity of granular food stuffs to a serving temperature in a heating assembly, the serving temperature being greater than the storage temperature, c) after completing step b), transferring the first quantity of granular foodstuffs into a receptacle, and d) providing the receptacle to the customer.

The method may also include dispensing at least a first condiment one the first quantity of foodstuffs in the receptacle prior to step d).

The method may also include, after completing step c), transporting the receptacle to a first condiment application station to receive the first condiment.

The method may also include transporting the receptacle to a second condiment application station to receive a second condiment.

The vending machine may include a second condiment application station for dispensing a second condiment into the receptacle, and wherein after receiving the first condiment, the receptacle is transported to the customer without entering the second condiment application station.

The receptacle may be transported using an automated receptacle transport unit.

The method may also include heating the first quantity of granular foodstuffs comprises holding the first quantity of granular foodstuffs in a heating pocket and passing at least a first stream of a hot heating fluid through the heating pocket.

The first quantity of granular foodstuffs may be heated to the serving temperature via the first stream of heating fluid, without submerging the first quantity of foodstuffs within a volume of the heating fluid.

The method may also include temporarily retaining a volume of the heating fluid within the heating pocket to temporarily submerge at least a portion of the first quantity of the granular foodstuffs, and then releasing the volume of heating fluid from the heating pocket prior to step c).

The method may also include passing a second stream of heating fluid through the heating pocket to heat the first quantity of granular foodstuffs.

The method may also include introducing the first stream through an upper end of the heating pocket, and introducing the second stream through a sidewall of the heating pocket.

The method may also include swapping the hopper utilized in step a) with a replacement hopper containing a fresh batch of the granular foodstuffs.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 121b is a top view of the portion of the vending machine of FIG. 12a;

FIG. 13b is a top view of the portion of the vending machine of FIG. 12a;

DETAILED DESCRIPTION

Figure 1:
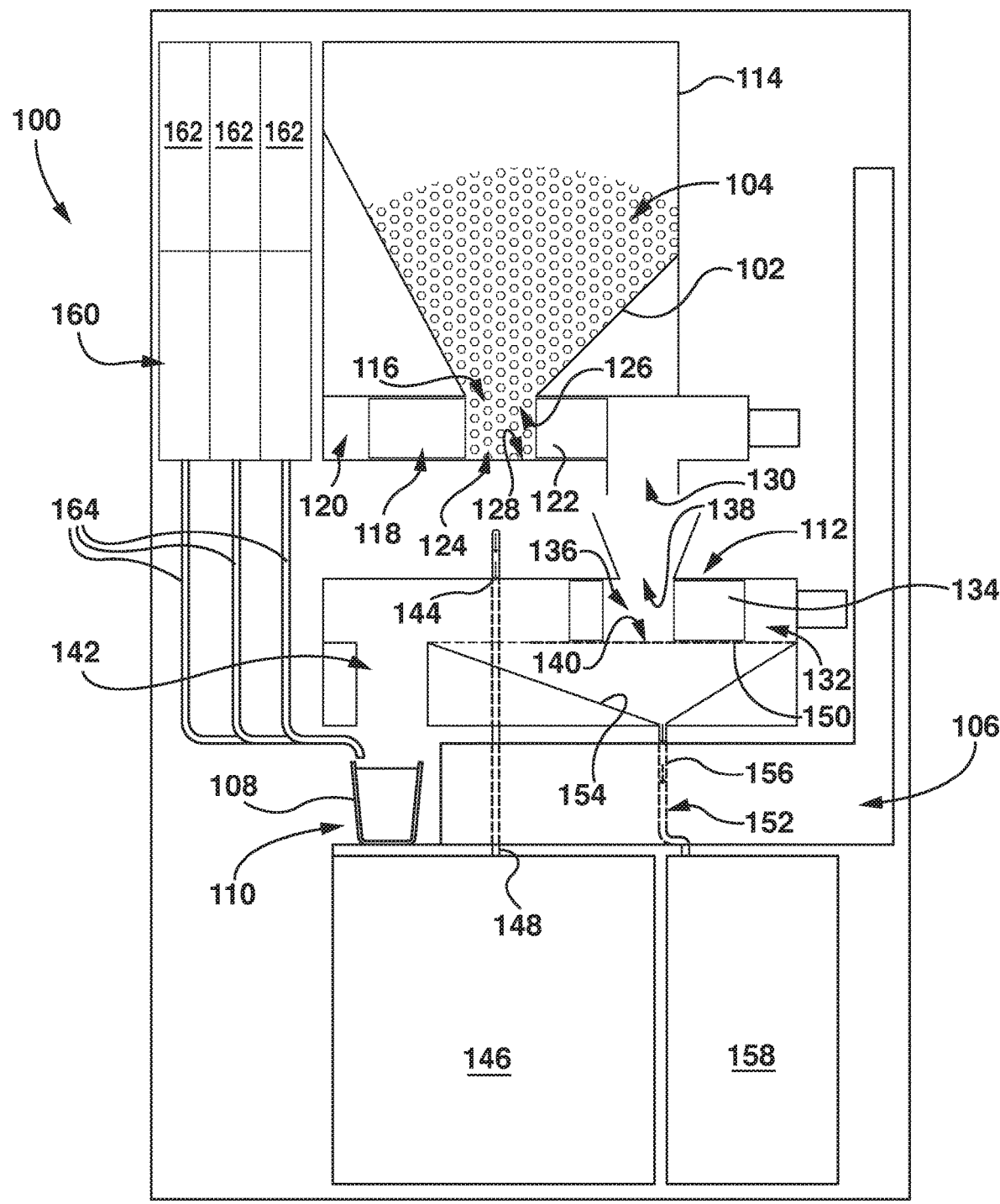
FIG. 1 is a schematic drawing of an example vending machine for dispensing heated granular foodstuffs, in a first stage of operation wherein the granular foodstuffs are in a cooled storage hopper of the vending machine.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein is a vending machine for dispensing granular foodstuffs. As used herein, the term "granular foodstuffs" refers to food in the form of discrete small pieces, such as grains, kernels, pods, seeds, nuts, and the like. Such food may include, but is not limited to, corn kernels, green peas, beans, chickpeas, and rice and other grains. In some particular examples, the vending machine disclosed herein is for dispensing corn kernels (also known as cup corn).

As will be described in detail below, the vending machine disclosed herein can store the granular foodstuffs in a cooled fashion—i.e. can refrigerate or freeze the granular foodstuffs. The granular foodstuffs may be fresh (e.g. corn kernels that have been recently removed from a fresh cob of corn), frozen, or pre-cooked, and need not necessarily be dried. Furthermore, on demand (e.g. upon insertion of a coin or upon other payment by a user), the vending machine disclosed herein can heat and dispense a measured quantity of granular foodstuffs. For example, a measured amount of corn kernels, such as approximately 250 mL of corn kernels (or another suitable weight or volume), may be heated and dispensed into a disposable cup. The heating of the foodstuffs may be to simply increase the temperature of the granular foodstuffs, or to cook the granular foodstuffs.

Furthermore, as will be described in detail below, the vending machine disclosed herein can also dispense a condiment onto the granular foodstuffs (e.g. after the granular foodstuffs are dispensed into the disposable cup). For example, in the case of corn kernels, the condiment dispenser may dispense butter, salt, pepper, or cheese. Other examples of condiments include hot sauce, ketchup, mustard, sugar, cinnamon, chocolate sauce or powder, lemon juice, lime juice, vinegar, and the like.

Referring now to FIGS. 1 to 5, a first example vending machine 100 is shown. As discussed above, the vending machine 100 is for dispensing heated granular foodstuffs 104. FIGS. 1 to 5 schematically show a series of operational steps for storing, heating, and dispensing a quantity of the granular foodstuffs 104.

Referring first to FIG. 1, in the example shown, the vending machine 100 includes a cooled storage hopper 102 for storing granular foodstuffs 104, a receptacle dispensing assembly 106 for dispensing a receptacle 108 into a receiving zone 110, and a heating assembly 112 for heating a quantity of the granular foodstuffs 104 received from the cooled storage hopper 102 and dispensing the quantity of the granular foodstuffs 104 into the receptacle 108 in the receiving zone 110.

In the example shown, the cooled storage hopper 102 is housed within a refrigerated compartment 114. The refrigerated compartment 114 may cool the granular foodstuffs 104 to a standard refrigeration temperature (e.g. at or below 4 degrees Celsius), or to a standard freezer temperature (e.g. at or below negative 18 degrees Celsius).

In the example shown, the cooled storage hopper 102 has an open bottom 116, through which the granular foodstuffs 104 exit the cooled storage hopper 102. In alternative examples, the cooled storage hopper 102 may have a bottom that is closed, but openable on demand. In further alternative examples, the granular foodstuffs 104 may exit the cooled storage hopper 102 in fashion other than via the bottom.

In the example shown, the granular foodstuffs 104 exit the cooled storage hopper 102 under the force of gravity. In other examples, the cooled storage hopper may include a device for forcing the granular foodstuffs from the cooled storage hopper.

Referring still to FIG. 1, in the example shown, the vending machine 100 further includes a discharge assembly 118 for discharging a quantity of the cooled granular foodstuffs 104. Specifically, the discharge assembly transports a quantity of the granular foodstuffs 104 from the cooled storage hopper 102 to the heating assembly 112. The discharge assembly 118 may in some examples be actuated upon receipt of payment in the vending machine. For example, the vending machine 100 may include a coin slot (not shown) or other payment station (e.g. a credit card payment station or a slot for bills, not shown). The discharge assembly 118 may be actuated upon receipt of payment at the payment station, and actuation of the other parts of the vending machine 100 (e.g. the heating assembly 112 and receptacle dispensing assembly 106) may follow actuation of the discharge assembly 118.

In the example shown, the discharge assembly 118 is in communication with the open bottom end 116 of the cooled storage hopper 102. The discharge assembly 118 includes a discharge chamber 120 adjacent the open bottom end 116, and a discharge actuator 122 in the discharge chamber 120. The discharge actuator 122 includes a discharge pocket 124. The discharge pocket 124 has a top opening 126 (also referred to herein as a "discharge pocket top opening 126"), and a bottom opening 128 (also referred to herein as a "discharge pocket bottom opening 128"). The discharge assembly 118 further includes a first chute 130 laterally spaced from the open bottom end 116 of the cooled storage hopper 102.

In use, the discharge actuator 122 is laterally slideable in the discharge chamber 120 between a first position (shown in FIG. 1) wherein the discharge pocket 124 is aligned with the open bottom end 116 and a second position (shown in FIG. 2) wherein the discharge pocket 124 is aligned with the first chute 130. Sliding of the discharge actuator 122 may be driven by a motor or other driving member.

Figure 2:
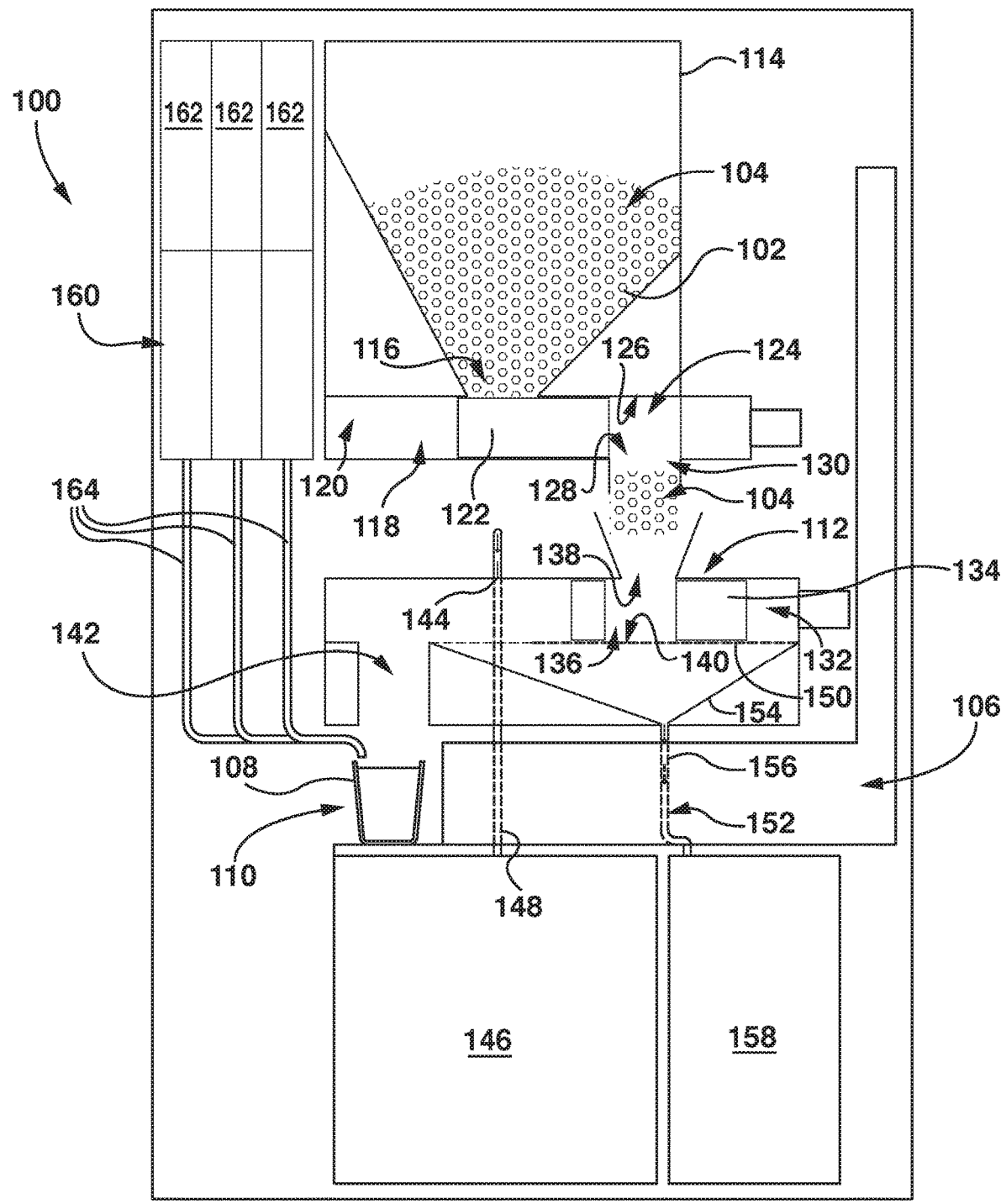
FIG. 2 is a schematic drawing of the vending machine of FIG. 1, in a second stage of operation wherein the granular foodstuffs are being discharged into a heating assembly.

Referring to FIG. 1, when the vending machine 100 is at rest (i.e. prior to receiving payment from a user), the discharge actuator 122 is in the first position, so that the discharge pocket 124 is filled with a quantity of the granular foodstuffs 104. Referring to FIG. 2, when the vending machine 100 is activated (i.e. upon receipt of payment from a user), the discharge actuator 122 slides to the second position, so that the quantity of granular foodstuffs 104 is released through the bottom opening 128 into the first chute 130.

As can be seen in FIG. 2, when the discharge actuator 122 is in the second position, the discharge actuator 122 blocks the open bottom end 116 of the cooled storage hopper 102, so that the granular foodstuffs 104 does not exit the open bottom end 116.

In the example shown, the size of the discharge pocket 124 defines the quantity of the granular foodstuffs 104 dispensed by the vending machine 100. The discharge pocket 124 can, for example, be sized to have a volume of about 100 mL, 125 mL, 200 mL, 250 mL, or more. In alternative examples, the quantity of the granular foodstuffs 104 dispensed by the vending machine 100 may be determined in another manner. For example, the bottom end of the cooled storage hopper 102 may be gated, and the gate may be tuned to release a certain volume or weight of the granular foodstuffs 104.

Figure 3:
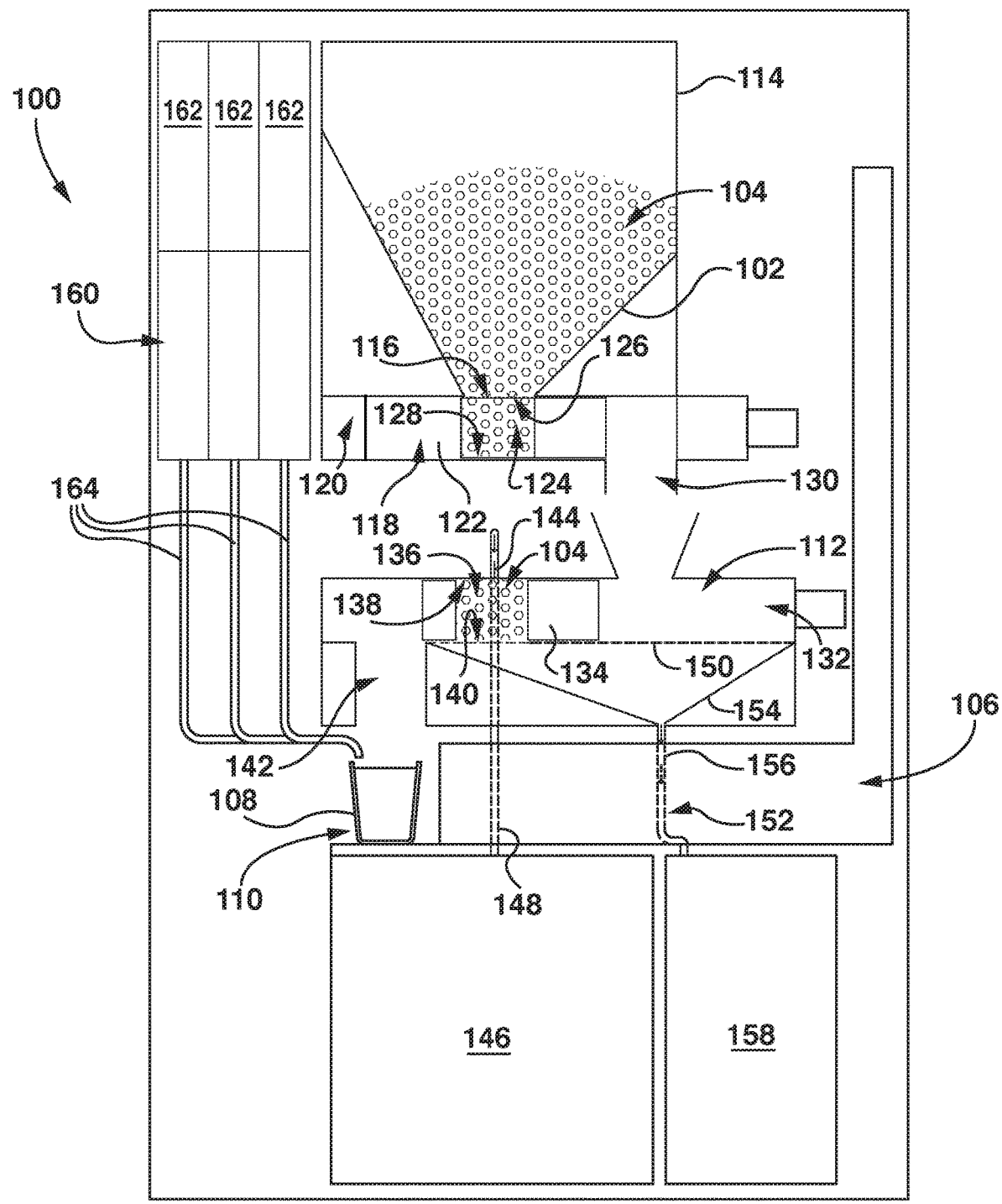
FIG. 3 is a schematic drawing of the vending machine of FIG. 1, in a third stage of operation wherein the granular foodstuffs are heated in the heating assembly.
Figure 4:
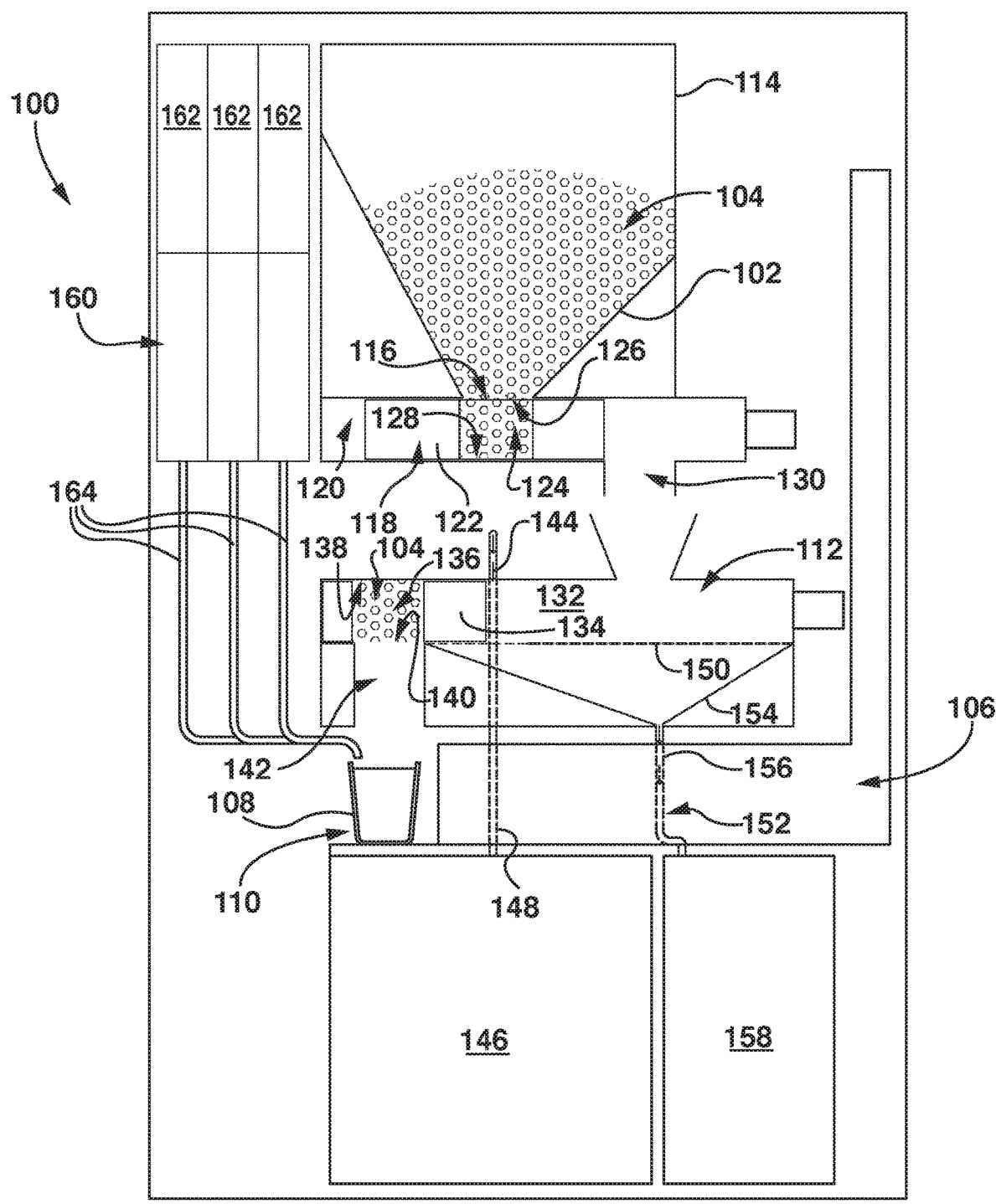
FIG. 4 is a is a schematic drawing of the vending machine of FIG. 1, in a fourth stage of operation wherein the granular foodstuffs are dispensed from the heating assembly.

Referring now to FIGS. 2 to 4, in the example shown, the heating assembly 112 heats the quantity of the granular foodstuffs 104 by applying a heating fluid to the granular foodstuffs 104. The heating assembly 112 includes a heating chamber 132 below the first chute 130, and a heating actuator 134 in the heating chamber 132. The heating actuator 134 includes a heating pocket 136. The heating pocket 136 has a top opening 138 (also referred to as a "heating pocket top opening") for receiving the quantity of the granular foodstuffs 104 from the first chute 130, and bottom opening 140 (also referred to as a "heating pocket bottom opening") for dispensing the quantity of the granular foodstuffs 104.

In the example shown, the heating pocket 136 is the same size as the discharge pocket 124. In other examples, the heating pocket may be of a different size form the discharge pocket. For example, the heating pocket may be twice the size of the discharge pocket. This may allow for a user to order a specific size of granular foodstuffs from the vending machine. For example, a user may select a small order, in which the discharge assembly slides one time from the first position to the second position to discharge one load of granular foodstuffs into the heating assembly. Alternatively, a user may select a large order, in which the discharge assembly slides two times from the first position to the second position, to discharge two loads of granular foodstuffs into the heating assembly.

In the example shown, the heating assembly 112 further includes a second chute 142, which is in communication with the heating chamber 132 and is laterally spaced from the first chute 130. The heating pocket 136 dispenses the quantity of the granular foodstuffs 104 into the second chute 142 via the bottom opening 140.

In the example shown, the heating assembly 112 further includes a heating fluid inlet 144 in the heating chamber 132 between the first chute 130 and the second chute 142. In the example shown, the heating fluid inlet 144 is a steam inlet, and the vending machine 100 further includes a steam generator 146 for supplying steam to the steam inlet 144, via a steam conduit 148.

In the example shown, the heating chamber 132 includes a porous bottom wall 150 (e.g. a mesh wall), below which is a drain assembly 152 for draining heating fluid from the heating assembly 112. The drain assembly 152 includes a drain basin 154, a drain conduit 156, and a drainage fluid storage tank 158.

The heating actuator 134 is laterally slideable in the heating chamber 132 amongst a first position wherein the heating pocket top opening 138 is aligned with the first chute 130, a second position wherein the heating pocket 136 is aligned with the heating fluid inlet 144, and a third position wherein the heating pocket bottom opening 140 is aligned with the second chute 142. Sliding of the heating actuator 134 may be driven by a motor or other driving member.

In use, at rest, the heating actuator 134 is in the first position. As shown in FIG. 2, when the vending machine 100 is activated and the quantity of the granular foodstuffs 104 is dropped into the first chute 130 by the discharge assembly 118, the quantity of the granular foodstuffs 104 lands in the heating pocket 136. The heating actuator 134 then slides to the second position, as shown in FIG. 3. When the heating actuator 134 is in the second position, the heating pocket 136 is in communication with the heating fluid inlet 144, and steam is supplied to the granular foodstuffs 104 in the heating pocket 136, to heat the granular foodstuffs 104.

The steam may be supplied to thaw, warm, and/or cook the granular foodstuffs 104. For example, where the granular foodstuffs 104 consist of frozen pre-cooked corn kernels, the steam may be supplied to thaw and warm the corn kernels. Alternatively, where the granular foodstuffs 104 consist of chilled raw corn kernels, the steam may be supplied to warm and cook the kernels.

As the steam condenses, it may drain through the porous bottom wall 150 and into the drain assembly 152.

In some examples, the heating actuator 134 can remain in the second position for a preset time period. The time period for which the heating actuator 134 remains in the second position may be set depending on the type of the granular foodstuffs 104 in the vending machine 100. For example, the time may be set to be relatively short if the granular foodstuffs 104 are being only warmed, or set to be relatively long if the granular foodstuffs 104 are being thawed and cooked. For example, the time period for which the heating actuator 134 remains in the second position can be 30 seconds, 60 seconds, 90 seconds, 120 seconds, or more. In some examples, steam is supplied to the heating pocket for only the time period during which the heating actuator 134 is in the second position.

Alternatively, the vending machine 100 can include a sensor (not shown) for determining the temperature of the granular foodstuffs 104 in the heating pocket 136. Instead of remaining in the second position for a preset time period, the heating actuator 134 can remain in the second position until a set temperature is detected by the sensor.

Figure 5:
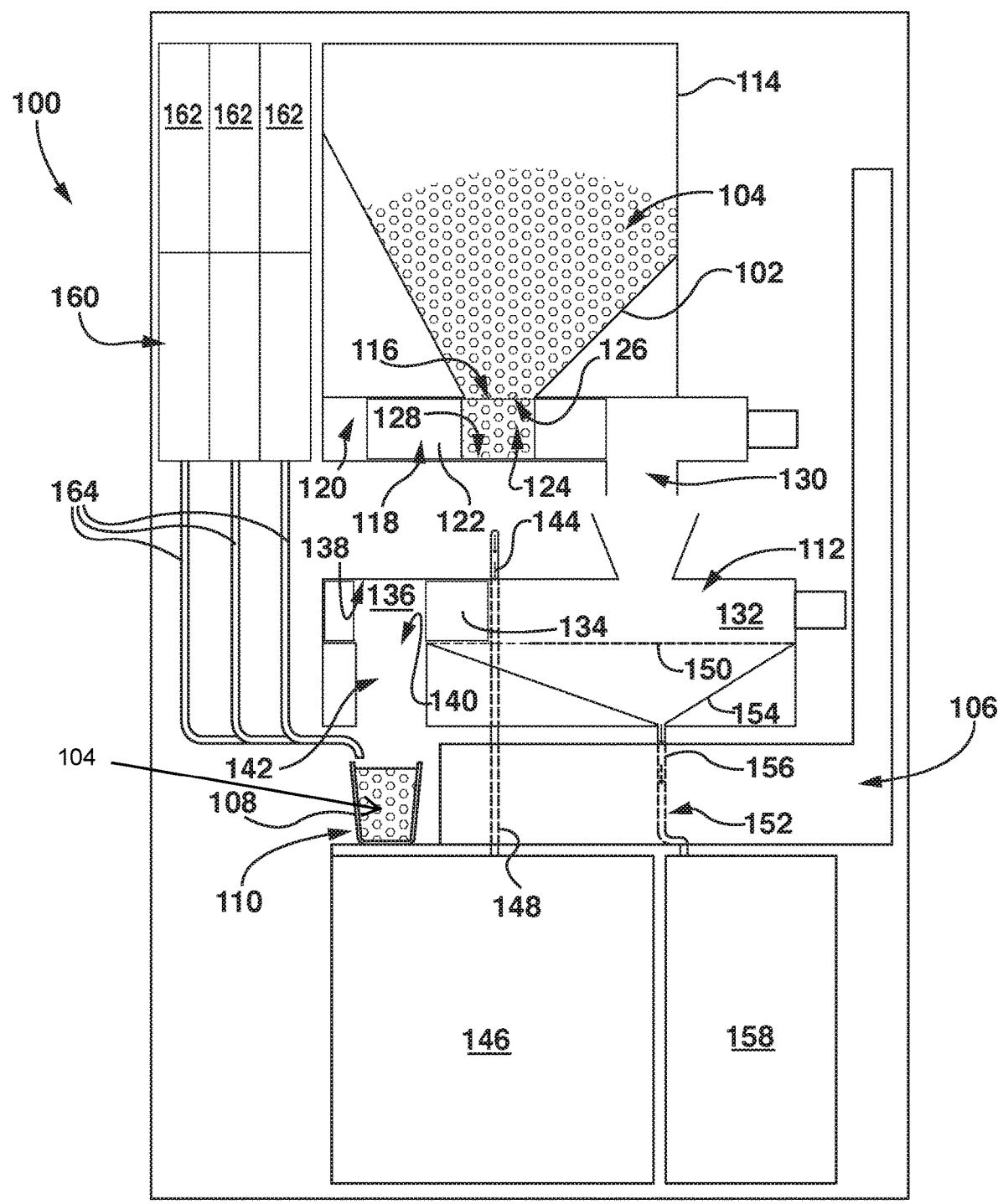
FIG. 5 is a is a schematic drawing of the vending machine of FIG. 1, in a fifth stage of operation wherein the granular foodstuffs are received in a receptacle in a receiving zone.

Referring to FIGS. 4 and 5, from the second position, the heating actuator 134 slides to the third position, wherein the heated granular foodstuffs 104 drop into the second chute 142. As mentioned above, the vending machine 100 includes a receptacle dispensing assembly 106 for dispensing a receptacle 108 into a receiving zone 110. The second chute 142 is vertically aligned with the receiving zone 110, so that the heated granular foodstuffs 104 drop into a receptacle 108.

In the example shown, the receptacle 108 is a cup, for example a paper or plastic cup. In other examples, the receptacle 108 may be a bowl, a plate, a cone, or another suitable receptacle 108.

The receptacle dispensing assembly 106 may be of any suitable configuration, and may be configured to position a new receptacle 108 in the receiving zone 110 when the vending machine 100 is activated by a user.

In the example shown, the vending machine 100 further includes a condiment dispenser 160, for dispensing at least one condiment into the receptacle 108 in the receiving zone 110. The condiment dispenser 160 can include set of condiment containers 162, each storing a different condiment, and a condiment conduit 164 extending from each condiment container 162 to the receiving zone 110. The vending machine 100 may have a user interface (not shown), where a user can select one or more condiments (or select no condiments) after paying at the payment station. When the quantity of the granular foodstuffs 104 has been deposited into the receptacle 108, the selected condiment(s) may be automatically dispensed from the condiment dispenser 160 onto the quantity of the granular foodstuffs 104.

After the quantity of the granular foodstuffs 104 has been deposited into the receptacle 108 and the selected condiment(s) have been dispensed by condiment dispenser 160 onto the quantity of the granular foodstuffs 104, the user may remove the receptacle 108 from the vending machine 100. Alternatively, in some examples, the vending machine 100 may be configured to move the receptacle to another location, such as a pickup window area.

Figure 6:
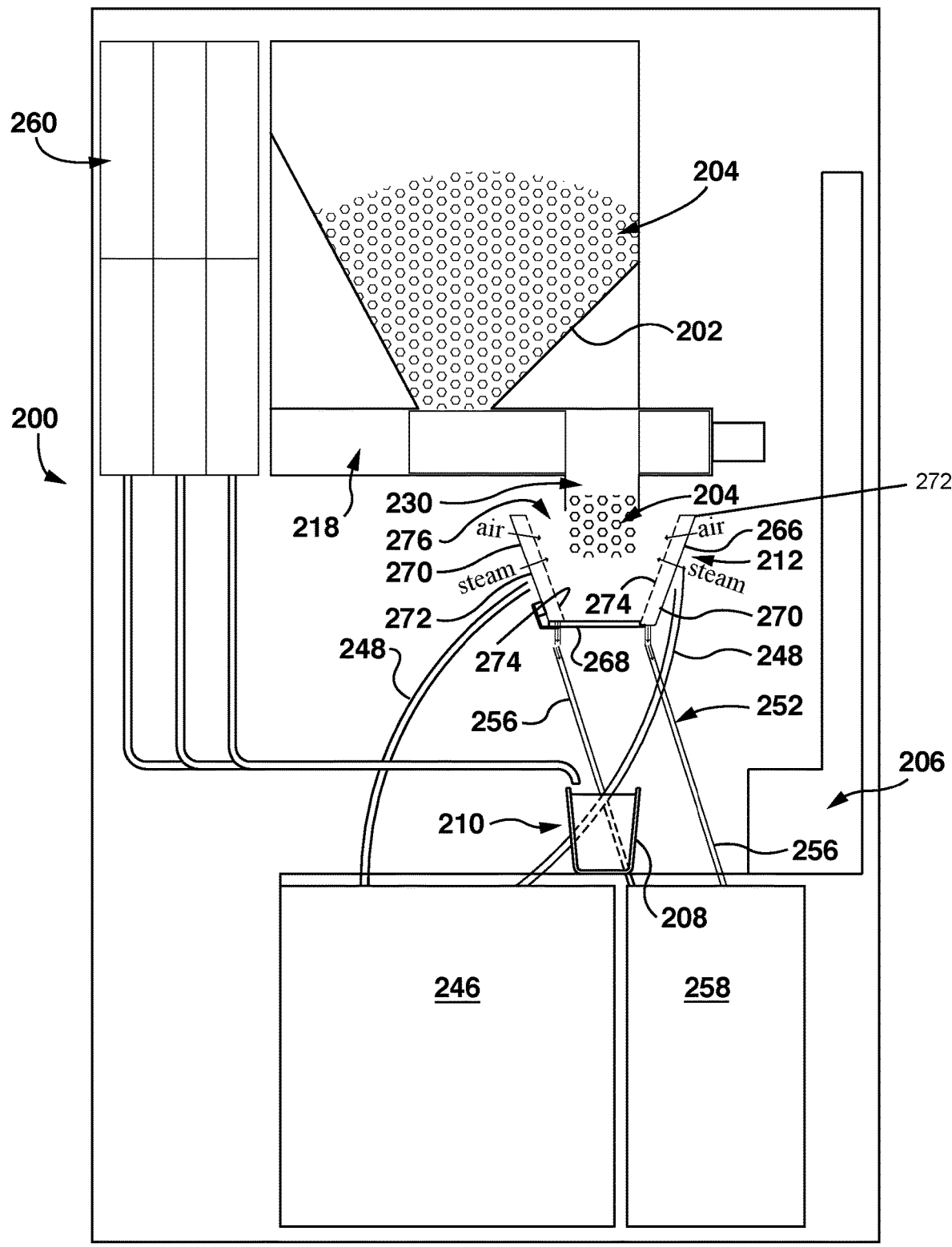
FIG. 6 is a schematic drawing of another example vending machine for dispensing heated granular foodstuffs, in a second stage of operation wherein the granular foodstuffs are being discharged into a heating assembly.
Figure 7:
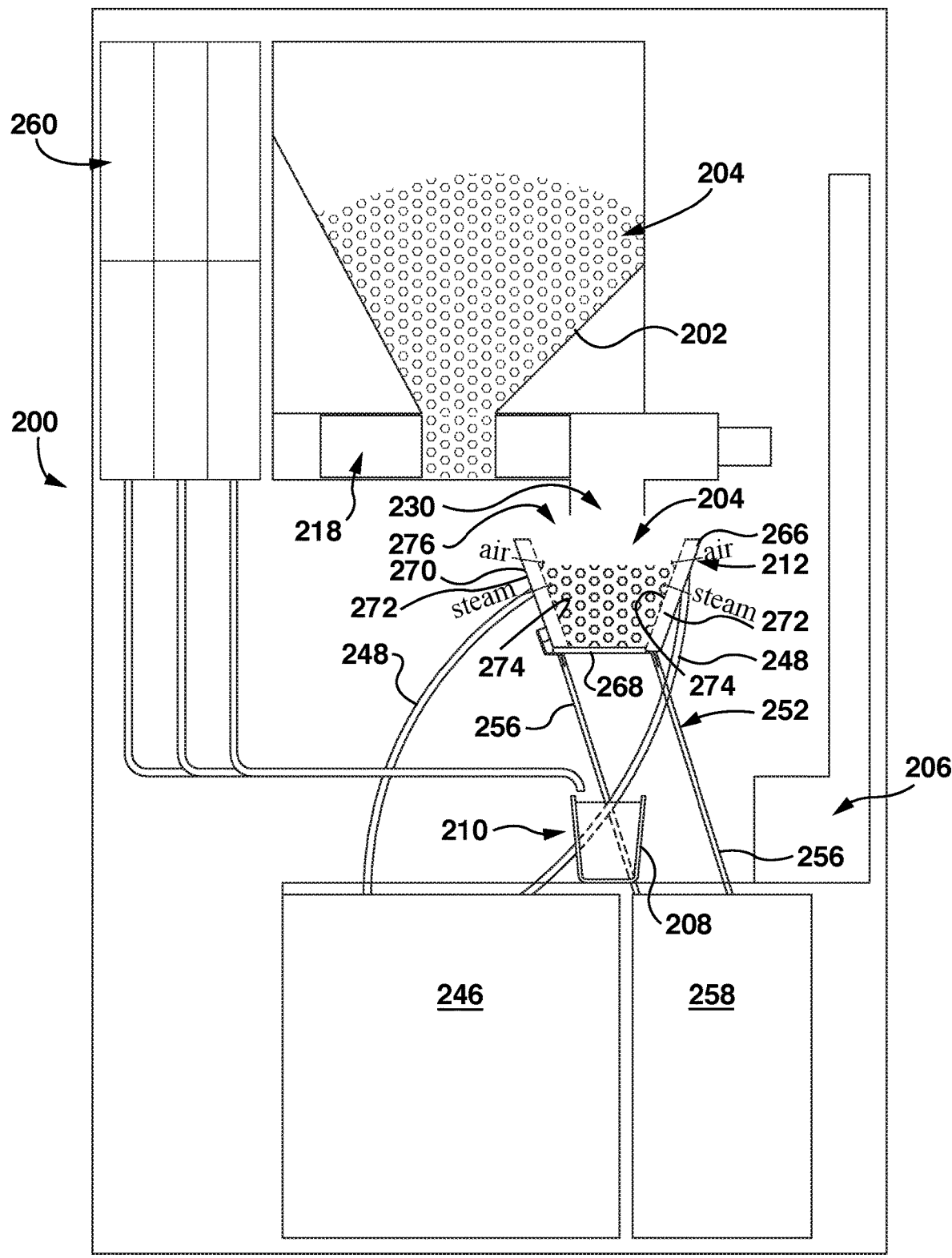
FIG. 7 is a schematic drawing the vending machine of FIG. 6, in a third stage of operation wherein the granular foodstuffs are heated in the heating assembly.
Figure 8:
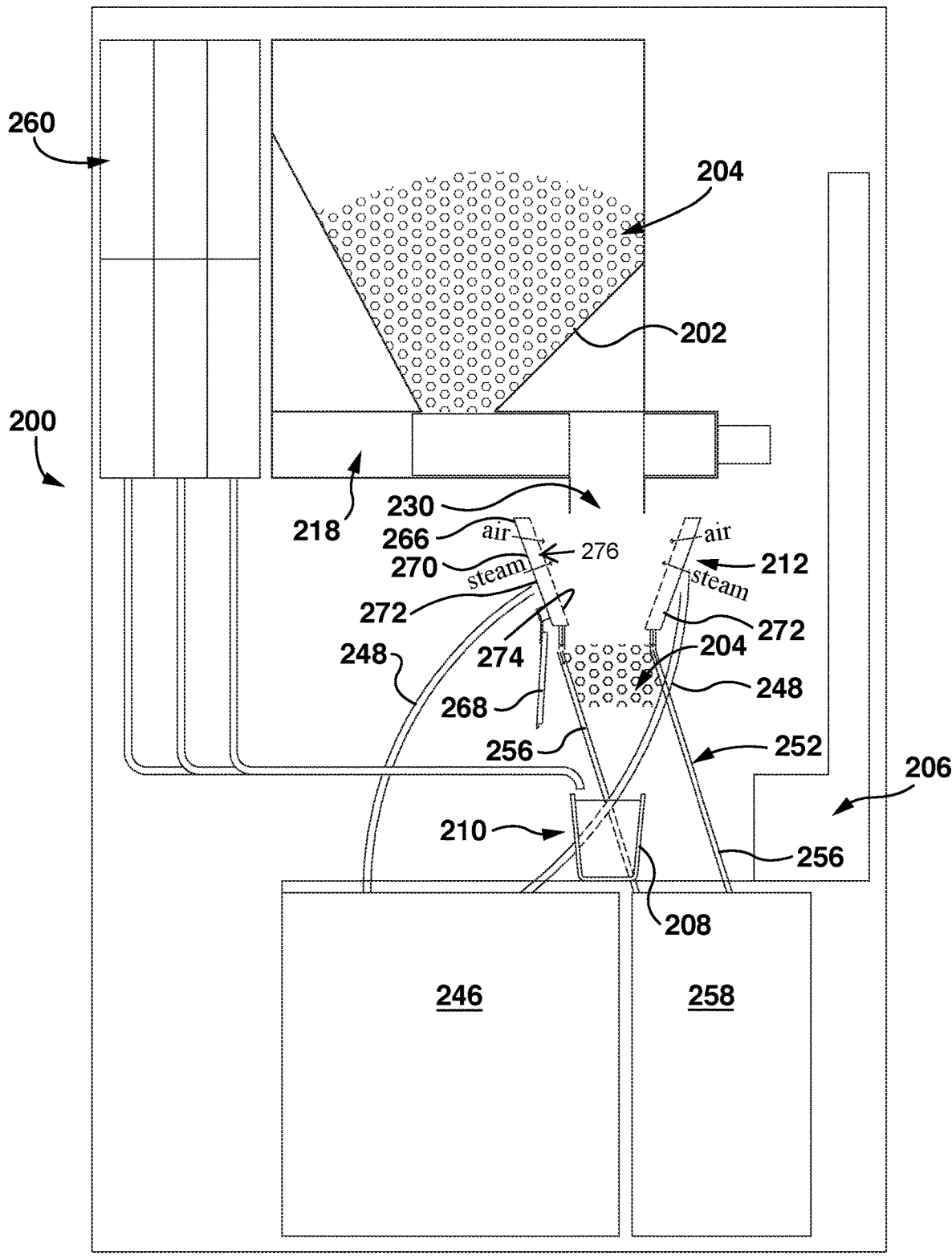
FIG. 8 is a schematic drawing the vending machine of FIG. 6, in a fourth stage of operation wherein the granular foodstuffs are dispensed from the heating assembly.

Referring now to FIGS. 6 to 8, another example vending machine 200 is shown. In FIGS. 6 to 8, like elements as in FIGS. 1 to 5 are referred to with like reference numerals, incremented by 100.

Vending machine 200 includes a cooled storage hopper 202, a discharge assembly 218, a receptacle dispensing assembly 206, and a condiment dispenser 260, all of which are similar to the elements of the vending machine 100 of FIGS. 1 to 5, and will not be described in detail herein. The heating assembly 212 of vending machine 200 differs from the heating assembly 112 of vending machine 100, and will be described in detail below.

Referring to FIG. 6, the heating assembly 212 includes a heating vessel 266 that has a bottom wall 268 and a sidewall 270. In the example shown, the sidewall 270 is generally frustoconical. The sidewall 270 includes an outer wall 272 and an inner wall 274, and a cavity 276 therebetween. The outer wall includes a steam inlet 244. The inner wall 274 is generally porous (e.g. may be made from a mesh material). The vending machine 200 includes a steam generator 246, which supplies steam to the cavity 276 via steam conduits 248 and steam inlet 244. The steam passes from the cavity 276 into the interior of the heating vessel 266.

Referring to FIG. 7, the bottom of the heating vessel 266 is openable. In the example shown the bottom is openable by pivoting of the bottom wall 268 away from the sidewalls 270. In alternative examples, the bottom may be openable in another fashion, for example the bottom may include a slideable gate.

Referring still to FIG. 7, the vending machine 200 further includes a drain assembly 252. The drain assembly 252 includes drain conduits 256 that are in communication with the cavity 276 and a drainage fluid storage tank 258.

Referring back to FIG. 6, the heating vessel 266 is vertically aligned with the first chute 230 and the receiving zone 210. In use, granular foodstuffs 204 drop from the discharge assembly 218 into the interior of the heating vessel 266. Referring to FIG. 7, steam is then supplied form the steam generator 246 to the cavity 276, and from the cavity 276 into the interior of the heating vessel 266, where it heats the granular foodstuffs 204. After a preset time or when a set temperature is reached, the supply of steam may be stopped. Referring to FIG. 8, the bottom of the heating vessel 266 may then be opened (i.e. bottom wall 268 may be pivoted open), and the heated granular foodstuffs 204 may drop into the receptacle 208 in the receiving zone 210.

In any of the above described examples, air may be supplied to the heating assembly in order to dry the granular foodstuffs 104 or 204 or prevent the granular foodstuffs 104 or 204 from becoming overly moist. For example, in the vending machine 200, an air conduit (not shown) may be in communication with a pressurized air source and with the cavity 276 of the heating vessel 266. After the steam is supplied or while the steam is being supplied to the granular foodstuffs 204 in the heating vessel 266, air may be blown through the granular foodstuffs 204.

In the above examples, steam is used as the heating fluid. In other examples, other fluids may be used, such as hot water or boiling water.

Referring now to FIGS. 9-19, another example vending machine 300 is shown. The vending machine 300 can be similar to the vending machines of FIGS. 1-5, and like elements are identified using like reference characters, incremented by 200.

Figure 9:
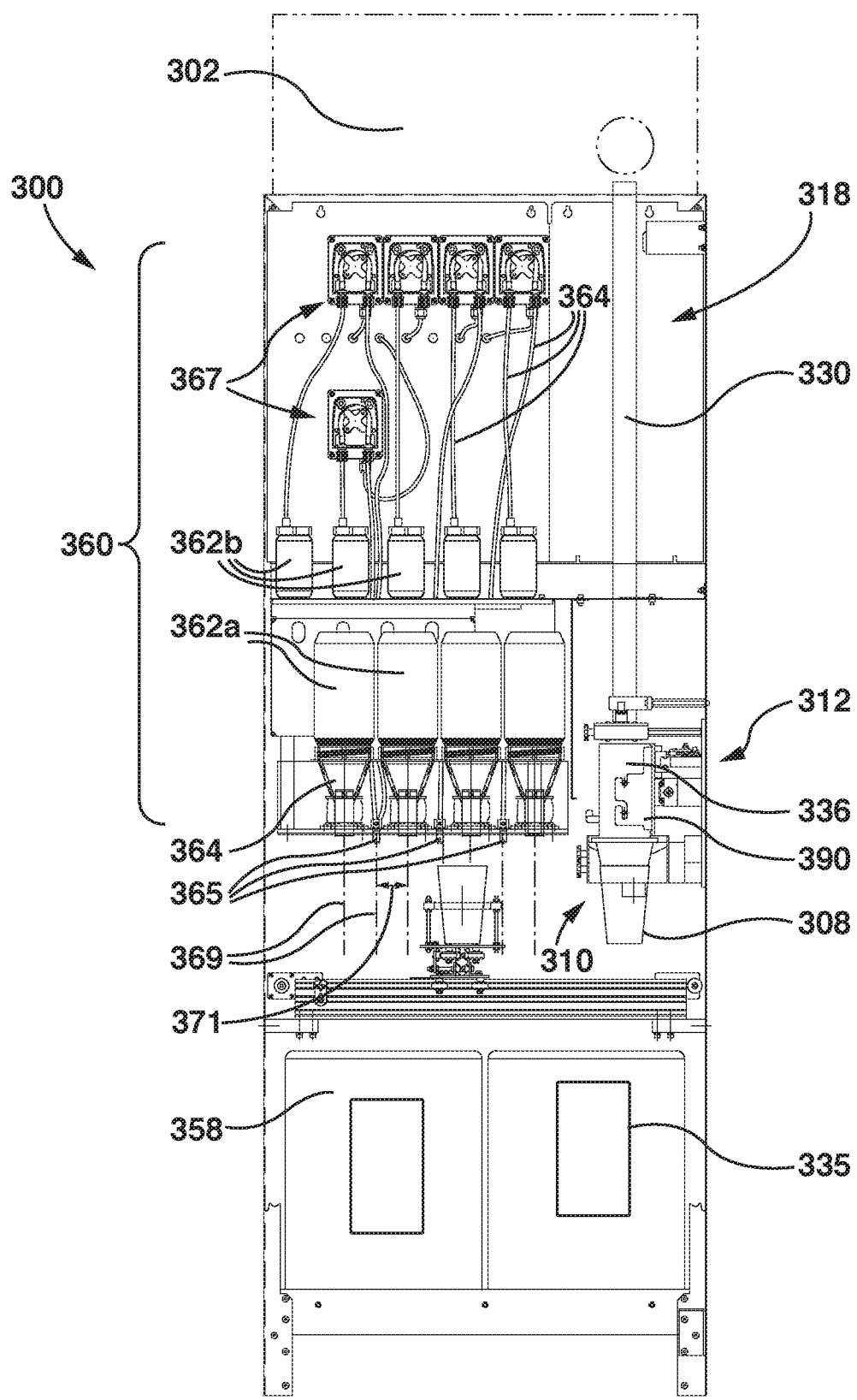
FIG. 9 is a front schematic drawing of another example vending machine for dispensing heated granular foodstuffs.

Referring to FIG. 9, the vending machine 300 includes a storage hopper 302 for storing granular foodstuffs and a discharge assembly 318 for discharging a quantity of the granular foodstuffs from the storage hopper 302. In this example, the granular foodstuffs are described as being kernels of corn, but other compatible foodstuffs may be used in place of the corn in other embodiments of the vending machine 300.

Figure 18:
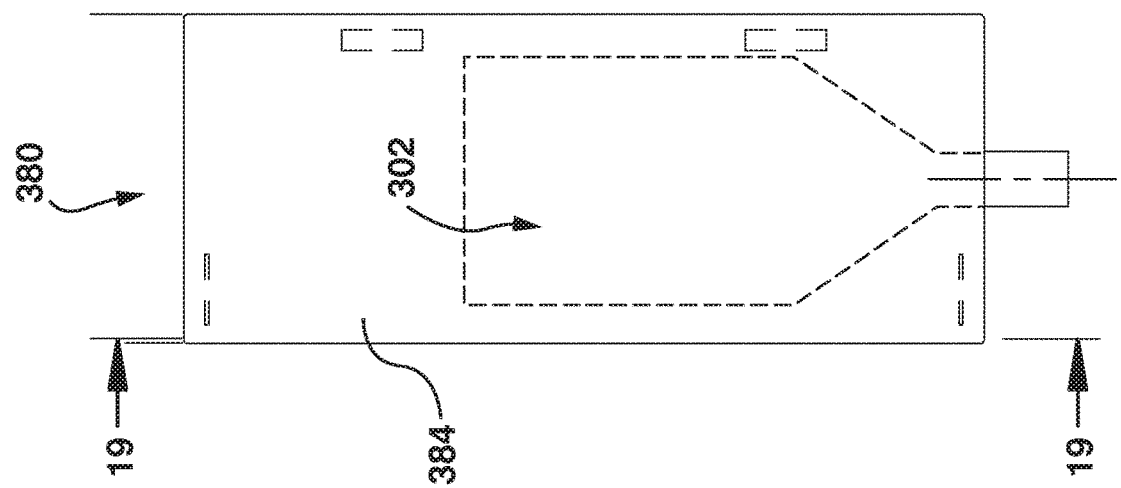
FIG. 18 is a front view of the storage hopper of FIG. 17.
Figure 17:
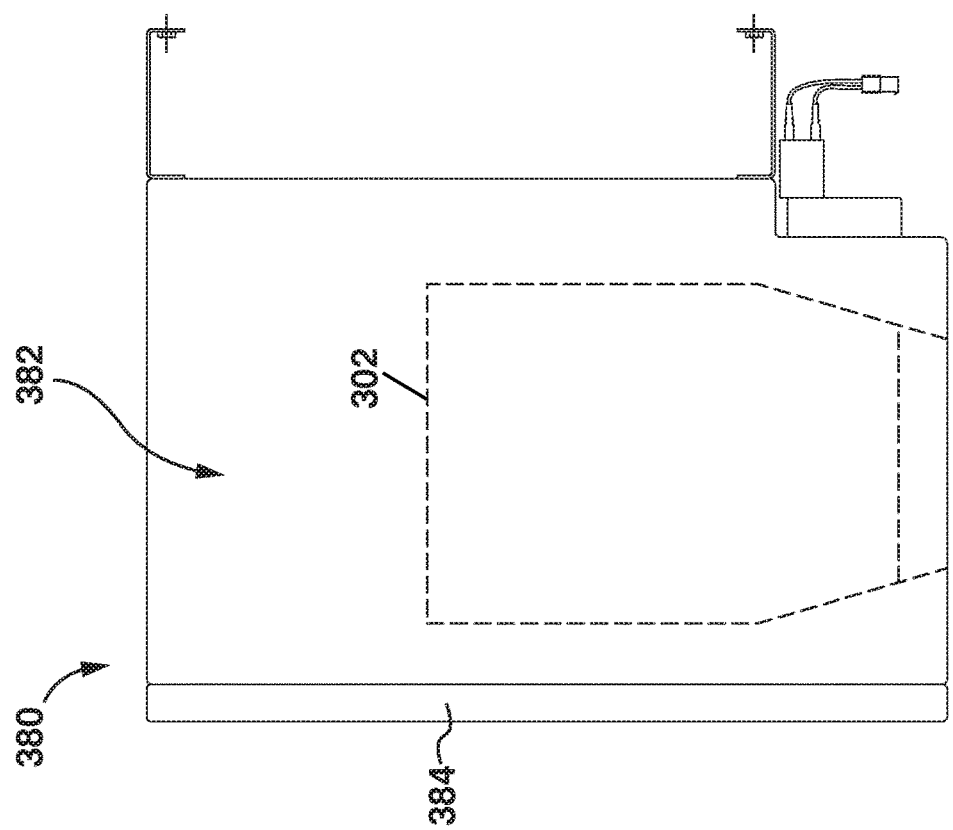
FIG. 17 is a side view of a storage hopper that is usable with the vending machine of FIG. 9.
Figure 19:
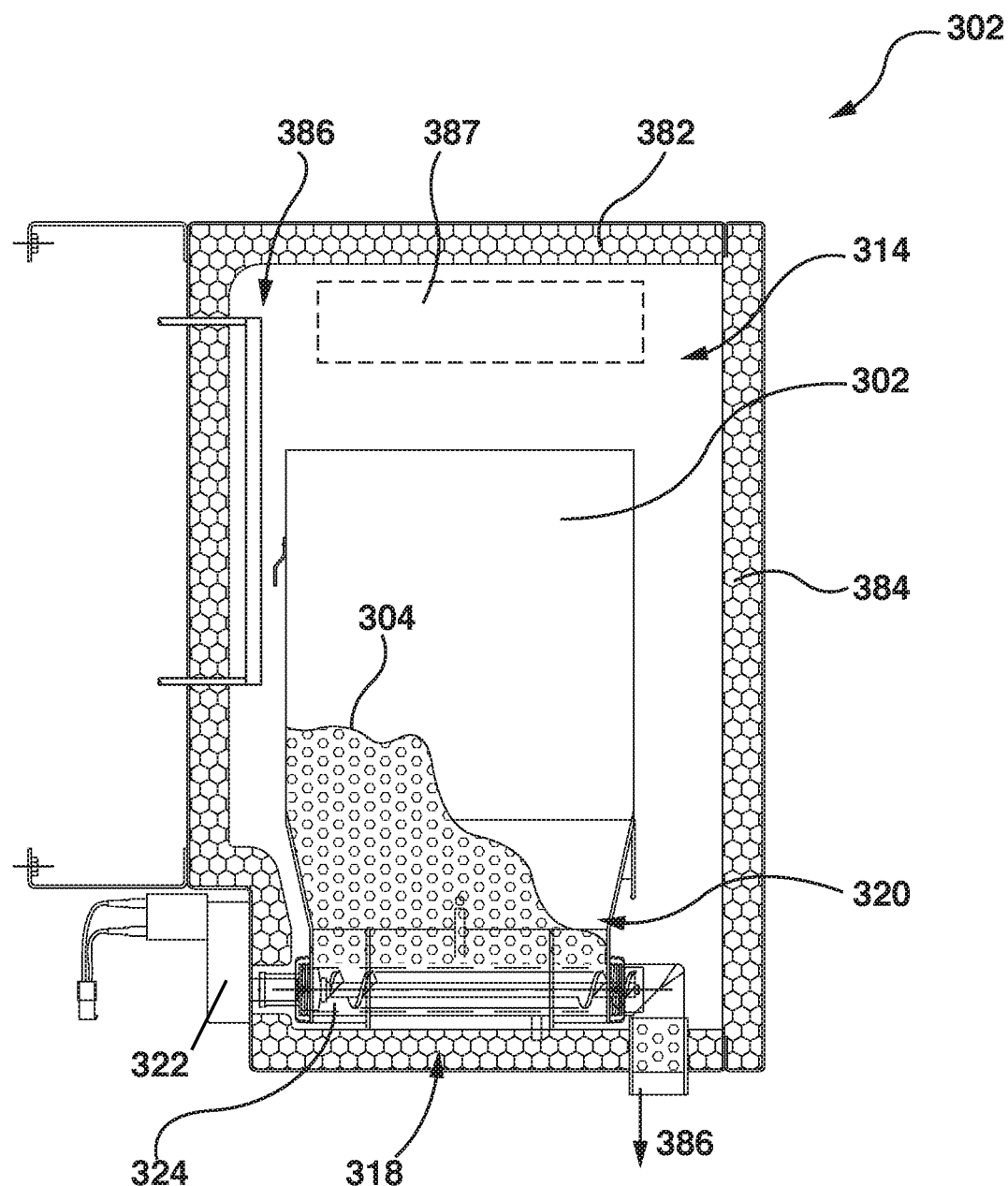
FIG. 19 is a cross-sectional view of the storage hopper of FIG. 18, taken along line 19-19.

Referring also to FIGS. 17-19, the storage hopper 302 used with the vending machine 300 may be configured to store the granular foodstuffs, e.g. corn kernels in this example, at room temperature, at a storage temperature that is higher than room temperature and/or at a storage temperature that is below room temperature. For example, the storage hopper 302 may be configured as a refrigerator, a freezer and the like.

Storing the granular foodstuffs are generally room temperature may require less energy (i.e. without the need to power a heating or cooling system) and may be suitable for some types of foodstuffs that can remain viable when stored at room temperature. Storing the granular foodstuffs at an elevated temperature may help reduce the length of time required to heat a given portion of granular foodstuffs when in the heading assembly. For example, if the contents of the hopper 302 are held at a storage temperature, the amount of energy and time required at the heating assembly 312 to heat a portion of the foodstuff to a final serving temperature may be reduced.

Referring to FIG. 19, in the illustrated embodiment, the storage hopper 302 is configured as a cooled storage hopper, and may cool the granular foodstuffs to a standard refrigeration temperature (e.g. at or below 4 degrees Celsius), or to a standard freezer temperature (e.g. at or below negative 18 degrees Celsius). In this example, the storage hopper 302 is surrounded by an insulated housing 380 with insulated sidewalls 382 and an openable, insulated door 384 that can opened provide access to the hopper 302. A cooling element 386, which may be a portion of a refrigeration system, can be provided inside the housing 380.

The storage hopper 302 may be provided with any suitable discharge assembly to help convey a portion of the foodstuffs from the hopper 302 to the heating assembly in the vending machine 300, including the assemblies shown in association with vending machines 100 and 200, an alternative discharge assembly as shown in FIG. 19, or any other suitable mechanism. In this example, the discharge assembly 318 is a positive displacement-type apparatus having a discharge chamber 320 and a complimentary screw member helps define a plurality of discharge pockets 324 within the chamber. An actuator, in the form of a motor 322, can help rotate the screw within the chamber 320 to convey each pocket 324, and the portion of the granular foodstuffs therein, through the chamber 320 and to a discharge opening 386. From the opening 386, the granular foodstuffs 304 can fall under the influence of gravity through a chute 330 (see FIG. 9—optionally provided as a generally cylindrical, pipe-like conduit) to the heating assembly 312. The chute 330 can be provided as part of the body or main housing of the vending machine 300, or may be provided as part of the storage hopper 302. Providing the chute 330 in the main body, as shown in FIG. 9, may allow the chute 330 to remain in place if the storage hopper 302 is removed for shipping, storage, cleaning, maintenance and the like. This may also allow a variety of differently configured storage hoppers to be interchangeably mounted to the vending machine 300, and connected to the upper end of the chute 330. Optionally, the storage hoppers 302 can be mounted to the upper end and/or top of the vending machine 300, which may help facilitate the use of gravity to convey the granular foodstuffs from the storage hoppers into the rest of the machine. This may also make the storage hoppers easier to access, service and/or swap without having to access or reconfigure other portions of the vending machine 300. Optionally, instead of being provided as a separate module, the storage hopper and related features may be provided within the main housing of the vending machine 300, and may optionally be non-removable.

Optionally, if the storage hopper 302 were to be maintained at an elevated temperature, the insulating housing 380 may be provided with an optional heating element 387 (such as an electric resistance heater, shown using dashed lines) instead of, or optionally in addition to the cooling element 386. Optionally, the housing 380 used with the vending machine 300 may be provided with both heating and cooling systems, such that it may help maintain the foodstuffs under either heated or cooled conditions. This may help the vending machine 300 accommodate different types of foodstuffs in difference circumstances, and/or may help provide desirable storage conditions for a given type of foodstuffs.

Figure 10:
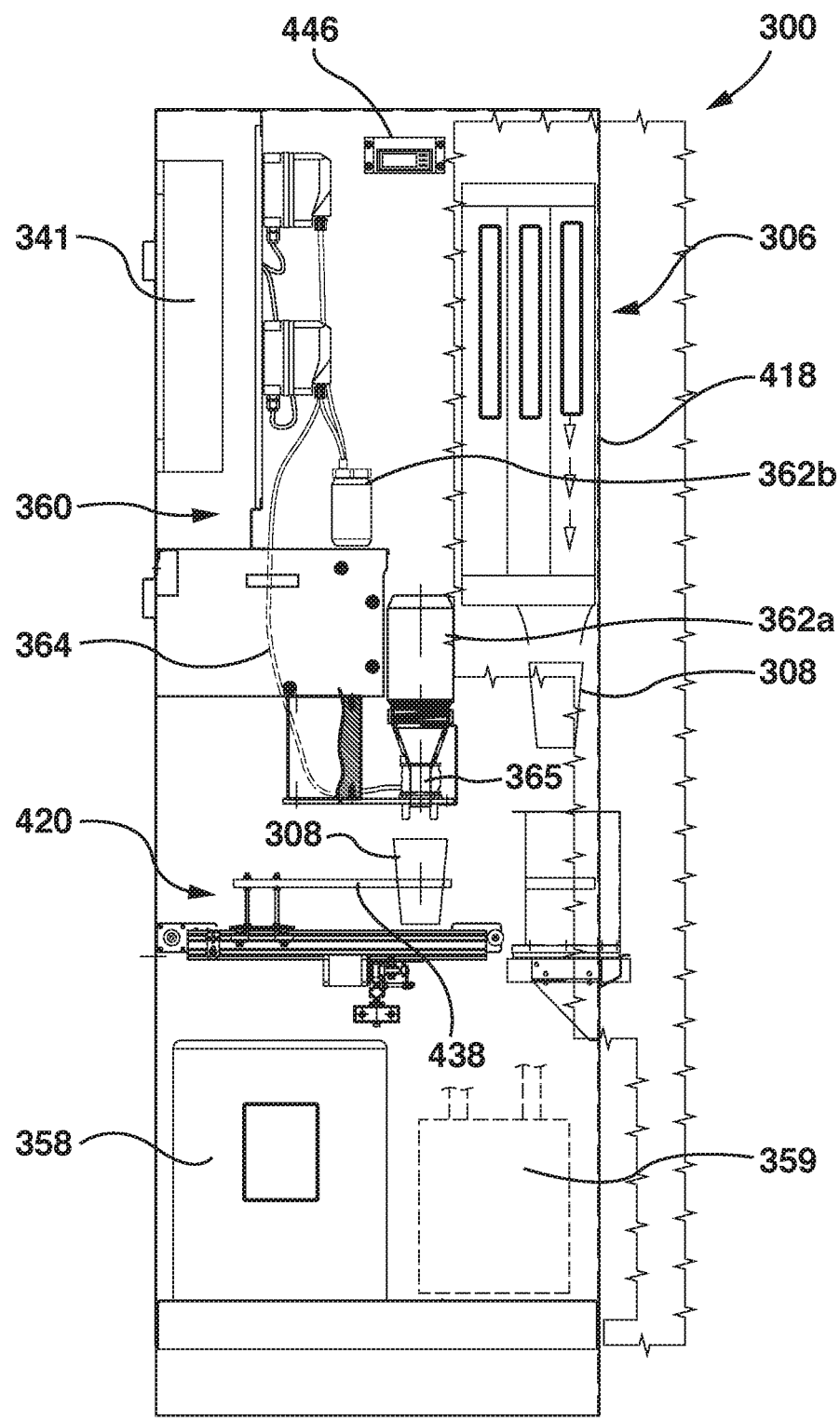
FIG. 10 is a schematic drawing of one side of the vending machine of FIG. 9.
Figure 11:
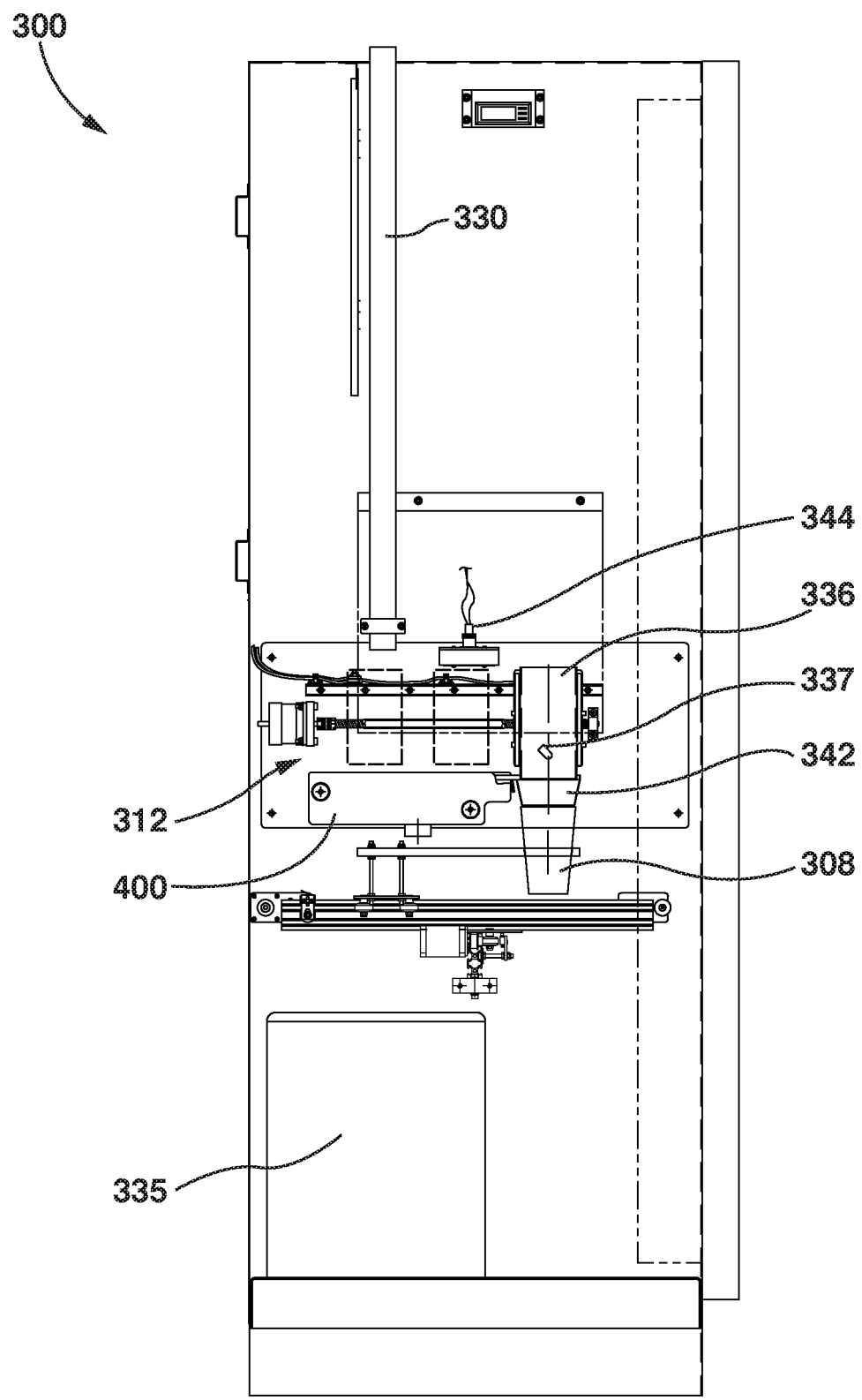
FIG. 11 is a schematic drawing of another side of the vending machine of FIG. 9

Referring to FIGS. 9-11, in addition to the storage hopper 302 and related equipment, the vending machine includes a heating assembly 312 to receive the granulated foodstuffs from the storage hopper 302 and heat the foodstuffs to a desired temperature, and a receptacle dispensing assembly 306 for dispensing receptacles 308, in the form of cups in this case, into the receiving zone 310. The cups can be carried by a receptacle transport unit 420 through the interior of the vending machine 300 to receive the heated foodstuffs from the heating assembly 312, and toppings from the condiment dispenser 360.

In some examples, the granulated foodstuffs may be pre-cooked or otherwise ready for direct consumption by a user when loaded into the storage hopper 302, and the heating assembly 312 may only need to heat the foodstuffs to a desired serving temperature. In other examples, the granulated foodstuffs may be uncooked and/or raw while held in the storage hopper 302, and the heating assembly 312 may be configured to cook the foodstuffs. For example, the granulated foodstuffs may include uncooked corn kernels, and the heating assembly 312 may be configured to cook the corn kernels during the heating process.

Figure 12A:
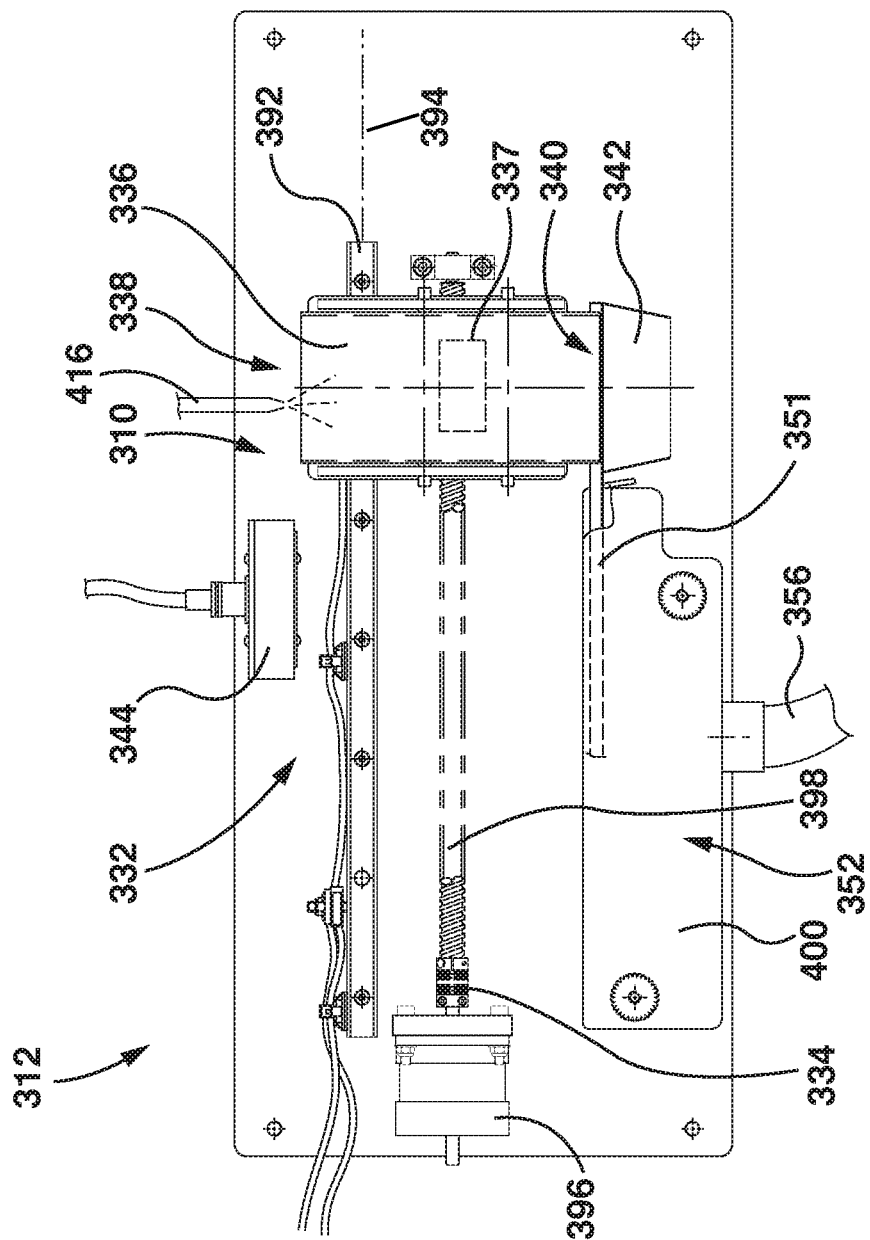
FIG. 12a is an enlarged, side view of a portion of the vending machine of FIG. 9.

Referring also to FIGS. 12a and 12b, in this example the heating assembly 312 includes a heating chamber 332 that may be bounded by side walls or, as illustrated may be at least partially open. A heating pocket, in the form of a heating pot 336 is configured to receive a batch of the granular foodstuffs and at least temporarily hold it during the heating process. The heating pot 336 has, in this example, a top opening 338 and a bottom opening 340. The heating pot 336 can be configured to hold any desired quantity of the granular foodstuff and have any suitable capacity, and may have capacity of about 100 mL, 125 mL, 200 mL, 250 mL, 500 mL or more.

The heating pot 336 is, in this example, removably carried by a heating actuator 334 that can move the heating pot 336 between its desired positions during the heating process. Providing a removable heating pot 336 may help facilitate cleaning and/or replacement of the heating pot, and the use of different types of heating pots 336 for use with different types of foodstuffs within a given vending machine. Alternatively, the heating pot 336 need not be removable.

In this example, the heating actuator 334 includes a carriage 390 that is slidably mounted on a rail 392, such that the carriage 390, and heating pot 336 carried thereon, can translated axially along a carriage axis 394. The heating actuator 334 also includes a drive motor 396 that is configured to drive a ball screw 398 that is operatively linked to the carriage 390, such that driving the ball screw 398 in one direction translates the carriage 390 away from the motor 396 (to the right as illustrated in FIGS. 12a and 12b), and driving the ball screw 398 in the other direction translates the carriage 390 toward the motor 396. Movement of the carriage 390 can be limited and controlled using any suitable mechanisms (optionally including via PLC), including a pair of limit switches 406 that can be used to define the outermost positions for the carriage 390.

The heating assembly 312 also includes a heating fluid applicator that includes a hot water nozzle 344 that is fluidly connected to a hot water reservoir, such as tank 335, that is provided toward the base of the vending machine 300. The tank 335 may be insulated, and may include any suitable heater, boiler and the like to heat the water in the tank 335 to the desired operating temperature for use with the cooking assembly 312. Optionally, the entire contents of the tank 335 can be heated and maintained at a desired operating temperature. Alternatively, the tank 335 may be maintained at a lower temperature (optionally ambient temperature), and a smaller amount of water can be drawn from the tank 335 and heated when required. For example, when a user orders one portion of the granulated foodstuffs, an amount of water that will be used to heat one portion of the granulated foodstuffs can be withdrawn from the tank 335 and heated on demand, for example via the boiler or other suitable mechanism. If a user requests multiple portions of the granulated foodstuffs, the amount of water withdrawn and heated can be increased accordingly. In other arrangements, the majority of the water in the tank 335 may be stored at room temperature and the vending machine 300 may include a separate, smaller reservoir 341 (FIG. 10 or optionally as part of a boiling assembly and/or as a sub-tank within the tank 335) that can container a relatively smaller volume of water (for example, enough water to heat/cook one, two or more portions of the granulated foodstuffs) and store the water at an elevated temperature. When an order is received from a user, hot water can be drawn from this sub-tank 341, and the sub-tank can then be refilled from the main reservoir and re-heated in anticipation of the next user order. Optionally, in some configurations the vending machine 300 need not store water at an elevated temperature, and instead may utilize a flow-through or on-demand type heating/boiling mechanism.

The nozzle 344 may be of any suitable configuration. The nozzle 344 may include an automated flow control device, such as a solenoid controlled valve mechanism, to control the flow of the water through the nozzle 344. Alternatively, the water supply mechanism, including the pump, may be controlled to selectively supply hot water to the nozzle 344, and may be controlled by the system controller to control when hot water is dispensed from the nozzle 344.

As shown in FIG. 12b, in this example at least a portion of the bottom wall 350 of the heating assembly 312 that underlies the nozzle 344 can be porous, i.e. can include openings 351. Preferable, the openings 351 are sized such that individual pieces of the granular foodstuff (i.e. corn kernels) will not pass through the openings 351. In this arrangement, water but not pieces of corn will pass through the openings 351, and the porous portion of the wall 350 can be used to help retain the granular foodstuff within the heating pot 336. This can allow hot water that is introduced into via the top opening 338 of the heating pot 336 to flow through the foodstuffs contained in the heating pot 336, flow out via the bottom opening 340 and drain through the porous region of the bottom wall 350 where water can then be collected in via the drain assembly 352 which may include a drip tray 400.

Optionally, the size and number of the openings 351 can also be set to help control the speed at which the hot water will drain from the interior of the heating pot 336 when the vending machine 300 is in use. If it is desirable that the water exit the heating pot 336 relatively quickly, the openings 351 may be made relatively large, whereas if it is desirable that the water exit the heating pot 336 relatively slowing, the openings 351 may be made relatively small, From the drip tray 400, the water can flow via drain line 356 (FIG. 2) for disposal and/or optionally for collection in an outlet holding tank 358 (FIG. 9). Water that has been used once in this manner, i.e. has been used to heat a portion of the foodstuffs, may be collected in the tank 358 and disposed of. Alternatively, at least some of the used process water may be recycled within the vending machine, and may be re-introduced into the supply tank 335 or combined with a supply of water that is drawn from the supply tank 335, such that the water supplied to the nozzle 344 is a mixture of used and unused water. Alternatively, an optional, separate recycling tank (see tank 359 indicated schematically in FIG. 10) that is separate from the outlet holding tank 358 may be used to capture water for the purposes of recycling. In such an arrangement, water that is intended to be recycled may be diverted to the recycling tank rather than flowing directly to the outlet holding tank 358, and then recirculated through the heating assembly 312 as desired. In such a configuration, the recycling system may be configured such that it does not draw water from the outlet holding tank 358, and so that water that is no longer suitable for recycling is sent directly to the outlet holding tank 358 rather than to the recycling tank.

Depending on the desired arrangement, the vending machine 300 may be provided with the appropriate water conduits, pumps, mixing valves, controllers, filters and the like to help provide the desired recycled water system.

Recycling at least some of the water in this manner may help reduce the overall water consumption of the vending machine 300, and may reduce the amount of energy required to heat the water. Optionally, instead of actually mixing the used and unused water streams, the vending machine 300 may include any suitable type of heat exchanger, such as a tube and shell heat exchanged, so that excess heat from the water exiting via the drain line 356 can be captured and used to help heat and/or maintain the temperature of water in the supply tank 335. This configuration may also help may reduce the amount of energy required to heat the water.

Optionally, the vending machine 300 may be connected to the municipal services available at the machine location. This may include a clean water supply line (providing potable water) that can be used to supplement and/or optionally replace the tank 335, and water from the supply line may be provided directly to the heating reservoir tank 341 if applicable. This may also include a drainage line that can be plumbed to the municipal sewer system, and may be used to supplement and/or replace the outlet holding tank 358.

Optionally, the heating pot 336 may include one or more auxiliary water inlets provided at other locations, such as in a sidewall. One example of such an auxiliary inlet is inlet port 337, shown in dashed lines in FIG. 12a and as another example is shown in the sidewall of the heating pot 336 in FIG. 11. Providing one or more of these auxiliary inlets can allow hot water to be sprayed into the interior of the heating pot 336 at different locations—assuming a corresponding source of hot water, such as another nozzle 344 is provided. Optionally, instead of providing a nozzle to spray water into the inlet port 337, the port 337 may be connected to a hose or other suitable conduit so that hot water can be injected into the port 337. The hose may be flexible such that it can remain attached to the heating pot 336 as it moves within the machine.

Adding hot water to the middle of the heating pot 336, in addition to or as an alternative to adding it via the top, may help speed up the heating process and may help heat the foodstuffs in the heating pot 336 more evenly.

Figure 20:
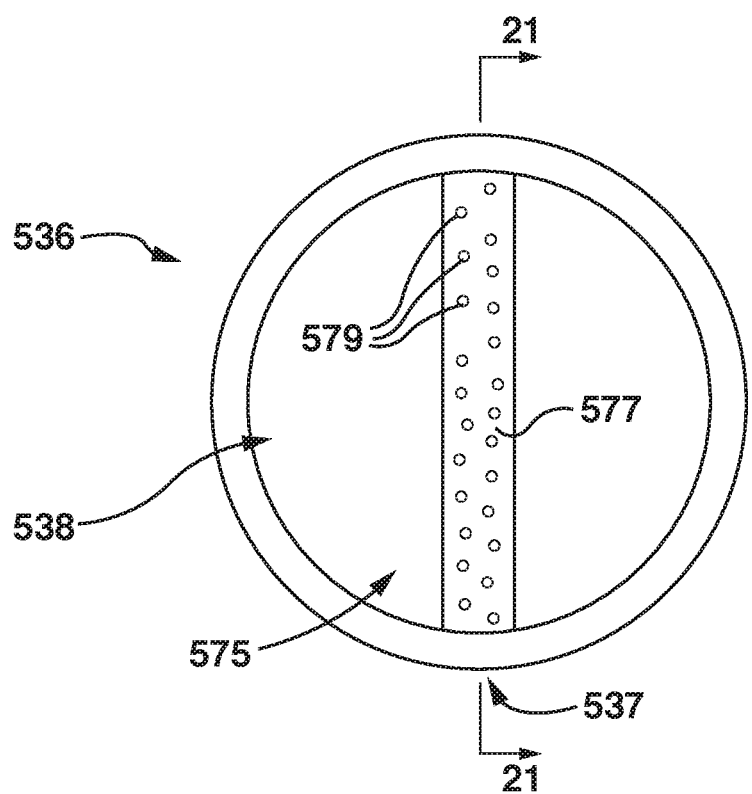
FIG. 20 is a top view of another example of a heating pot.
Figure 21:
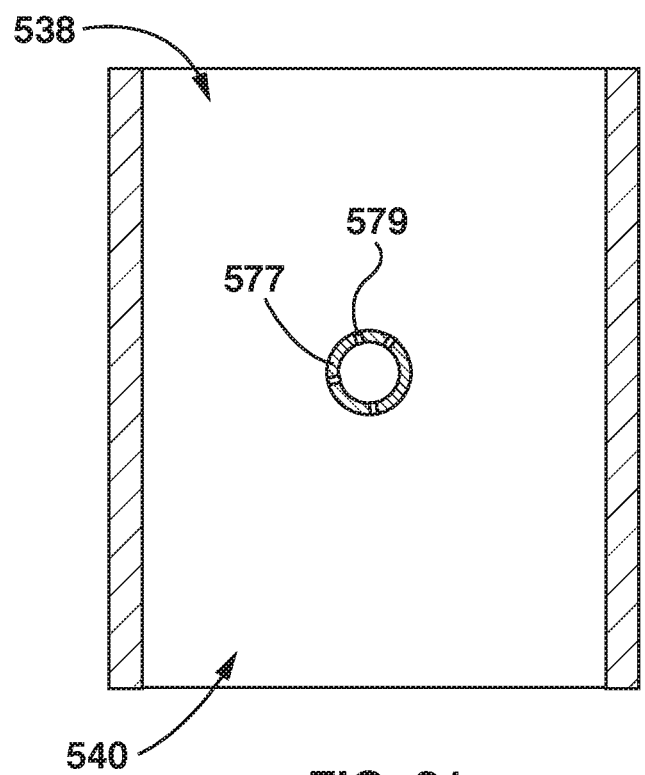
FIG. 21 is a cross-sectional view of the heating pot of FIG. 20, taken along line 21-21.

Optionally, the heating pot may include one or more internal fluid flow conduits that can introduce the heating fluid (such as water or steam) into the interior of the cooking pot and help distribute amongst the foodstuffs held in the heating pot. Referring to FIGS. 20 and 21, another example of a heating pot 536 that is usable with the vending machine 300 is shown. The heating pot 536 is generally similar to heating pot 336, and like features are annotated using like reference characters incremented by 200. In this example, the heating pot 536 has a top opening 538, a bottom opening 540 and a side inlet port 537 that can be connected to a fluid supply line. The heating pot 536 also includes an internal sprayer 575 that receives hot water (or steam) from the inlet port 537 and distributes the hot water into the interior portions of the foodstuffs held in the heating pot 536. In this example, the internal sprayer 575 includes a pipe 577 that extends from the inlet port 537 and that has a plurality of outlet holes 579 spaced apart from each other along its length and about its circumference. The holes 579 may be of any suitable size and arranged in any desired pattern. Water sprayed from the holes 579 may help heat the inner portions of the foodstuffs in the heating pot 536, and may then drain out via the bottom opening 540 along with any other heating fluid that has been applied.

While shown with only a single pipe 577, the internal sprayer 575 may have more than one pipe or other suitable fluid handing conduits. Optionally, the pipe may extend across the entire interior of the heating pot 536, or may extend only partially across the interior of the heating pot 536. The pipe 577 may be positioned toward the middle of the heating pot 536 as shown in FIG. 21, or may be positioned toward the top, toward the bottom or in any other suitable location within the interior of the heating pot 536. While shown as being generally horizontal, the pipe 577 may alternatively be oriented generally vertically within the interior of the heating pot 536, or at any intermediary orientation.

In this example, the heating pot 336 is movable, relative to the rest of the heating assembly 312, between a first position wherein the top opening 338 is aligned with the first chute 330 (the left most position shown in dashed lines in FIG. 11), a second position wherein the heating pot 336 is aligned with the nozzle 344 (the central position shown in dashed lines in FIG. 11), and a third position wherein the bottom opening 340 is aligned with the second chute 342 (where the carriage 390 is illustrated in FIGS. 11 and 12*a*-12*b*).

When the heating assembly 312 is in use, the heating pot 336 carried by the carriage 390 can receive the cold granular foodstuffs from the chute 330, and can then be translated to the second position, where hot water from the nozzle 344 is sprayed into the heating pot 336 and onto the foodstuffs therein, in accordance with a pre-determined heating cycle. When the heating cycle is complete, for example when the foodstuffs have reached a desired temperature, the carriage 390 is moved into the third position where the carriage 390 is aligned with the second chute 342. The second chute 342 is, in this example, aligned with the receiving zone 310, so that the heated granular foodstuffs 304 drop into a receptacle 308 (FIG. 11). The receptacle 308 can then be transported to the condiments dispenser 360 to receive any condiments that are to be applied (e.g. as selected by a user of the vending machine when ordering, based on a predetermined recipe that is programmed into the vending machine 300 and the like) and can then be transported to the pick-up window to be received by the user.

Optionally, the heating assembly 312 may utilize some type of mechanism or operating technique to help dislodge the heated foodstuffs from the heating pot 336 so that they can fall into the receptacle 308. This may help ensure that substantially all of the heated granular foodstuffs is successfully transferred to the receptacle 308, and may help reduce the changes that portions of the foodstuff are retained in the receptacle 308. This may help a user receive the entire portion of the foodstuffs they purchased, and may help prevent fouling of the heating pot 336.

In the illustrated example, the heating actuator 334 can be operated in a dislodge mode, in which the motor 396 can rapidly change directions which can cause the carriage 390 to shudder and/or shake in the axial direction. Shaking the carriage 390 in this manner may help dislodge the foodstuffs from the heating pot 336. Alternatively, or in addition to moving the carriage in a reciprocating manner, the carriage 309 may be moved toward the third position at a relatively fast speed, and then stopped abruptly by the motor 396, which may also cause the carriage 309 to shake in a desired manner (but without actually reversing direction). Optionally, the heating assembly 312 may also include some type of dislodging apparatus that can help dislodge the foodstuffs from the heating pot 336. For example, a mechanical plunger mechanism may be inserted into the heating pot 336 to push the foodstuffs downwardly, and out through the bottom opening 340. The plunger may closely fit within the heating pot 336, and optionally may include a wiping member to wipe along the inner surface of the sidewalls of the heating pot 336. In other examples, a blast of air or other suitable fluid may be blown into the top opening 338 of the heating pot 336, such as by optional air nozzle 416 (FIG. 21*a*) to help blow the foodstuffs out of the heating pot 336.

Optionally, the heating assembly 312 may be configured to include a washing station that can be used to help clean the heating pot 336 between uses. This may help keep the heating pot clean 336 and may help remove any remnants of the granular foodstuffs that do not fall out of the heating pot 336 under the influence of gravity. Such a washing station may also be provided on any other suitable portion of the vending machine 300.

Figure 13A:
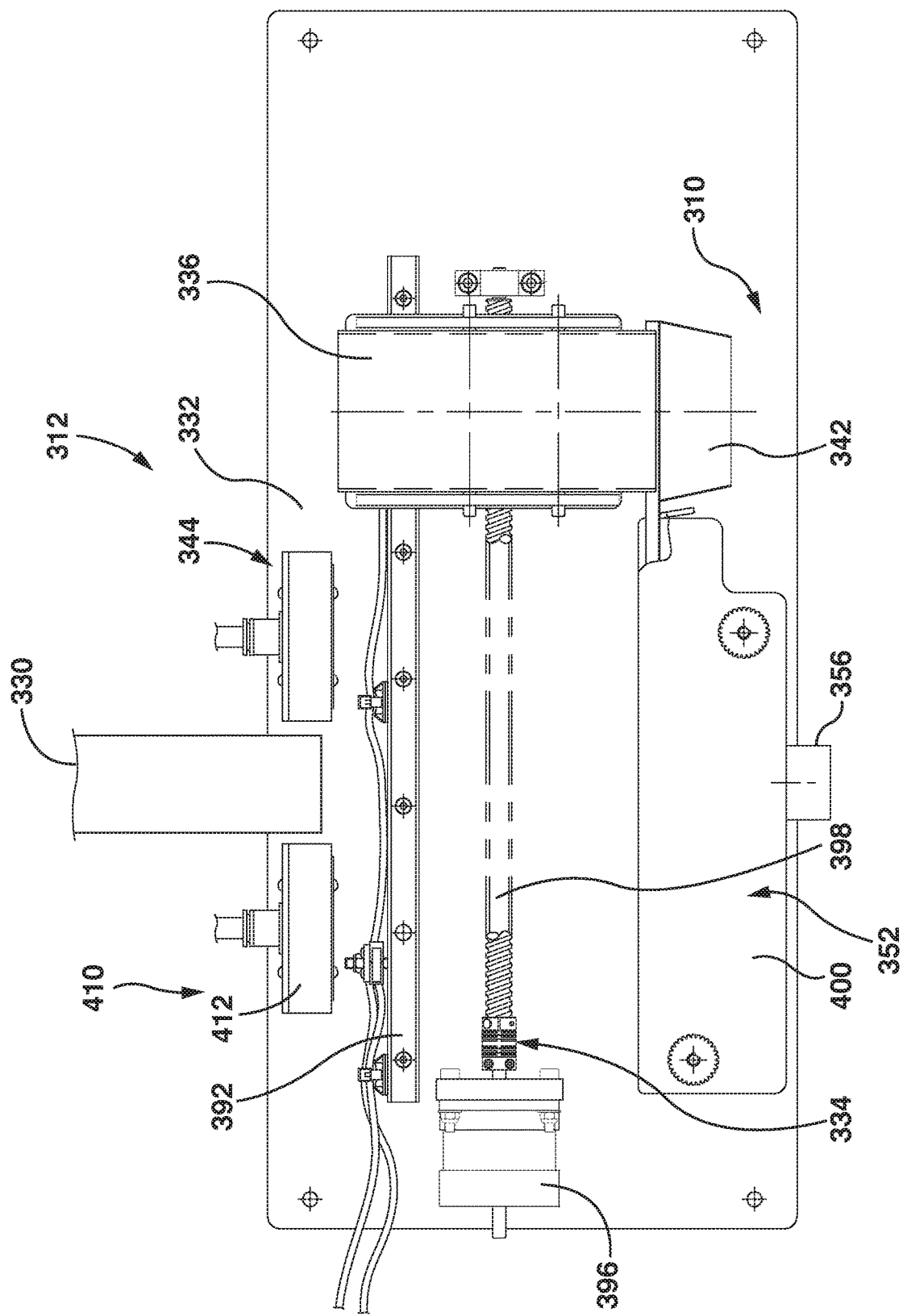
FIG. 13a is an enlarged, side view of a heating assembly that is usable with the vending machine of FIG. 9.

Referring to FIGS. 13*a* and 13*b*, an alternate embodiment of the heating assembly 312 includes a washing station 410 having a washing nozzle 412 and a drain aperture 414 in the bottom wall 150 that that is registered beneath the nozzle 412, and is in fluid communication with the drip tray 400. In this configuration, the heating actuator 334 is operable to move the carriage 390 into a washing position, in which the carriage 390 is registered beneath the washing nozzle 412. The The drain aperture 414 is preferably sized to accommodate pieces of foodstuff and other such debris that may be dislodge from the heating pot 336 during washing, and to allow the debris to flow into the drip tray 400 for disposal without be trapped or retained on the upper side of the bottom wall 350.

In this arrangement, the washing station 410 is located toward one end of the heating station 312, such that the first and second positions are located axially between the washing position and the third position. In other embodiments, the washing station 410 may be in another location, such as, for example, so as to position the washing position axially beyond the third position.

Optionally, instead of having a movable carriage 390 as illustrated, the heating assembly 312 may be arranged so that other portions of the assembly, such as nozzles 344, 412, bottom wall 350 and chute 342, are movable in addition to, or as an alternative to, moving the carriage 390.

Optionally, the heating assembly 312 may be configured so that the bottom opening 340 in the heating pot 336 can be selectably closed, and blocked in a generally water-tight manner. In such configurations, when the bottom door is closed, at least some of the hot cooking water may be retained within the heating pot 336 to submerge at least a portion of the granular foodstuffs therein. This may help facilitate the heating/cooking of the foodstuffs. In one configuration, the openings in the porous bottom wall 350, i.e. mesh, can be blocked using any suitable blocking or sealing member, such as a cover or flap. Blocking the openings in the bottom wall 350, when the heating pot 336 is registered above the openings, may allow at least some of the heating water to be retained within the heating pot 336 for a pre-determined holding time, and until the openings in the bottom wall 350 are unblocked. Optionally, the heating assembly 312 can be configured such that the heating pot 336 can be made water tight for the pre-determined holding time.

Alternatively, or in addition to blocking the openings in the bottom wall 350, the heating assembly 312 may include a movable bottom door that can be used to at least temporarily cover the bottom opening 340 in the heating pot 336. The door may be slidable, pivotal or otherwise joined to the rest of the apparatus so that it can be selectably opened and closed. Optionally, the bottom door may be substantially liquid impermeable, and may cover the bottom opening 340 an at least partially water-tight manner.

Optionally, the heating pot 336 may be sized to hold more than one receptacle's worth of foodstuffs. For example, the heating pot 336 may be configured to be two or three times larger than the cups that are intended to be used to serve the corn kernels. If, for example, the heating pot 336 is at least three times larger than the receptacles 308, the heating pot 336 may be filled approximately one third full if a user orders a single portion of corn kernels and/or a small sized order from the vending machine 300. Optionally, if a user orders two separate small servings of corn kernels and/or a larger sized single serving (i.e. a "large"), the vending machine 300 may process each order sequentially (i.e. separately heating one third of the capacity of the heating pot 336), or alternatively two servings of corn may be deposited into the heating pot 336 to be heated simultaneously. When the corn is heated to the desired temperature, half of the corn in the heating pot 336 may be transferred to a first receptacle 308, and the remaining corn may then be transferred to a second receptacle 308 in rapid succession. This may help serve two or more portions of corn without requiring a user to wait through multiple heating cycles. The metering of the corn as it exits the heating pot 336 may be done using any suitable metering apparatus, and may include, for example, utilizing a selectably openable door at the bottom opening 340 of the heating pot 336. Alternatively, the vending machine 300 may include a separate metering apparatus that can be positioned to receive the entire batch of heated corn form the heating pot 336, and then sub-divide the batch into the desired number of individual portions/receptacles.

From the second position, the heating actuator 334 slides to the third position (FIG. 11), wherein the heated granular foodstuffs 304 drop into the second chute 342.

To heat the granular food stuffs, the hot water may be applied to the granular food stuffs in for any suitable duration, including a continuous application of hot water during the entire heating cycle and optionally in a pattern of intermittent pluses of hot water, separated by pauses between sprays, during an overall heating cycle. For example, the heating cycle for the contents of the heating pot 336 may last for a period of time, such as about 2 minutes, but hot water may only be applied to the granulated foodstuffs for a portion of that time, such as about 1 minute in total, and may optionally be applied using two or more separate pulses. For example, the heating assembly 312 may be configured to apply a pulse of hot water for about 15 seconds, pause for about 15 seconds, apply a second pulse of hot water for about 15 seconds, pause for another 15 seconds, and this pattern may be repeated until the total application of hot water reaches about 1 minute and the total heating cycle reaches about 2 minutes. Alternatively, the pulses need not be of the same duration as each other, or as the pauses. For example, over the course of a 2 minute heating cycle the heating assembly 312 may utilize a 30 second pulse of hot water, followed by a 20 second pause, a 15 second pulse of hot water, a 30 second pause, a 15 second pulse of hot water and a final 10 second pause/resting period before the granular foodstuff is ejected from the heating pot 336. The operation of the heating station in this manner may be controller by the vending machine controller, and the configuration of a given heating cycle may be selected based on the granular foodstuffs to be heated, the operating temperatures and parameters of other aspects of the vending machine, the desired serving temperature and the like. It has been discovered that utilizing a heating cycle with intermittent pulses of hot water can help heat the granular foodstuffs to approximately the same temperature that can be achieved using a continuous spray of hot water for the duration of the heating cycle, while using less hot water over the course of the heating cycle. This may help reduce water usage by the vending machine 300, and may reduce the energy required to operate the vending machine 300.

Optionally, like condiment dispensers 160 and 260, the condiment dispenser 360 can be configured to contain a variety of different types of condiments to be applied to the foodstuffs held in a receptacle 308. These may include dry-type condiments that can be stored in a hopper or the like (such as salt, pepper, spices, seasonings, mushrooms, chilies, herbs, cheeses and the like wet-type condiments that are applied to the foodstuffs in a generally liquid or slurry based form (such as sauces, melted butter, hot sauce, different kind of oils, dressings, gravy and the like), and optionally may include a combination of both dry and wet-type condiments.

Referring to FIGS. 9 and 10, in the illustrated example, the condiment dispenser 360 includes a plurality of separate condiment containers 362 with individual condiment conduits 364 each of which terminate in respective outlets 365 in the receiving zone 310. In this example, the condiment dispenser includes hopper-like containers 364a for containing dry condiments, and separate containers 364b for containing wet condiments. The containers 364a and 364b may be stored under different conditions. For example, some containers may be refrigerated or otherwise cooled inside the vending machine 300, some may be stored at ambient temperature and some may optionally be heated.

In the illustrated example, the condiment containers 362a and 362b can each include suitable dispensing hardware, such as generally chute-like portions on the bottom of the containers 364a configured to hold dry condiments, and pumps 367 and the like associated with the conduits 364 carrying wet condiments stored in containers 364b.

Optionally, the condiment containers 362a and 362b may be independently controlled by the vending machine 300, such that each condiment container 362 can be operated independently of the other condiment containers 362, and/or in any desired combination. This may help keep each condiment separate, and may help prevent cross-contamination of the condiments and their flavours when applying the condiments to the foodstuffs in a given receptacle 308 (for example as compared to an arrangement in which two or more condiments are dispensed through the same condiment outlet, which may lead to a mixing of a condiment being dispensed with residual traces of a different condiment that remain in the condiment outlet).

An unintended mixing of condiments may interfere with the flavor of the finished foodstuffs, which may be undesirable to the user. In some circumstances, unintended mixing of condiments may also pose a danger or heath risk to a user, such as, for example if one or more of the condiments is an allergen or has other health effects. For example, a user who is lactose intolerant may request foodstuffs that do not include dairy-based toppings (like cheese, butter and the like), and may be displeased and suffer health-related consequences if her requested topping were inadvertently cross-contaminated with a dairy-based topping within the vending machine. Other similar consequences may affect users with other food-based allergies.

Optionally, to help reduce the likelihood of mixing condiments, the condiment dispenser 360 may include two or more different condiment application stations, which allows the receptacle 308 to be registered beneath a corresponding one of the discrete condiment outlets 365. In the illustrated example, each condiment application station corresponds to the region registered beneath on of the outlets 365, the centerline of which is shown using axes 369 in FIG. 9.

The spacing distance 371 between adjacent condiment application stations may be generally constant, as shown, or may vary such that the outlets 365 are not equally spaced apart from each other. In the illustrated example, the spacing distance 371 is set such that the distance between adjacent outlets 365 is less than the width of the receptacle 308. In this arrangement, two adjacent outlets 365 may both overlie a single receptacle 308 at the same time. This may facilitate apply two or more toppings simultaneously to the receptacle 308. Alternatively, the vending machine 300 may be configured so that the outlets 365, or at least some of the outlets 365 are spaced such that only one outlet 365 will overlie the receptacle 308 at any given time. This may help prevent inadvertent dripping of an unwanted condiment into a receptacle 308 that is receiving a condiment from an adjacent outlet 365.

Optionally, in some examples of a vending machine, the condiment application stations, and outlets 365 defining their positions, may be arranged generally linearly, such that the receptacle 308 may pass through one of the condiment stations in order to reach the next condiment station. For example, a machine may include four different condiments stations arranged in a row, such that for a receptacle to arrive at the third condiment station it would first pass through condiments stations one and two, regardless of whether condiments are in fact dispensed at stations one and two. This may help reduce the overall size of the vending machine and the condiment dispenser. In such configurations, condiments that have stronger flavours and/or that are considered to be allergens and the like can be stored in remote, downstream condiment application stations, instead of the earlier, upstream condiment application stations.

For example, in the illustrated example the condiment dispenser 360 is shown with a total of nine condiment containers 362. In this example, a condiment that is an allergen may be stored in the seventh condiment container 362 (on the far left as illustrated in FIG. 9), and dispensed via the left most outlet 365. In such an arrangement, the receptacle 308 may optionally progress through the condiment application stations one through four to receive desired toppings, but need not even pass beneath the outlet 365 corresponding to the ninth condiment container 362 during the condiment application process. This may help reduce the likelihood that the condiment in condiment station seven may drop in the receptacle 308, as compared, for example to positioning the allergen condiment in the first condiment application station which the receptacle 308 would pass under during each use. Other configurations of the vending machine 300 may include a different number of containers 362.

Optionally, the vending machine 300 can have any suitable type of receptacle dispensing assembly that can be used to provide receptacle and to help move the receptacle through the interior of the vending machine 300 as needed, including bringing the receptacle to the heading assembly 312 and condiment dispenser 360 and then delivering the receptacle to a user.

Referring to FIG. 10, in this example the receptacle dispensing assembly 306 includes a cup dispensing unit 418 that can hold a quantity of receptacles 308 (e.g. cups). The receptacle dispensing assembly 306 also includes a receptacle transport unit 420 that can maneuver the receptacle 308 through the vending machine 300.

Figure 14:
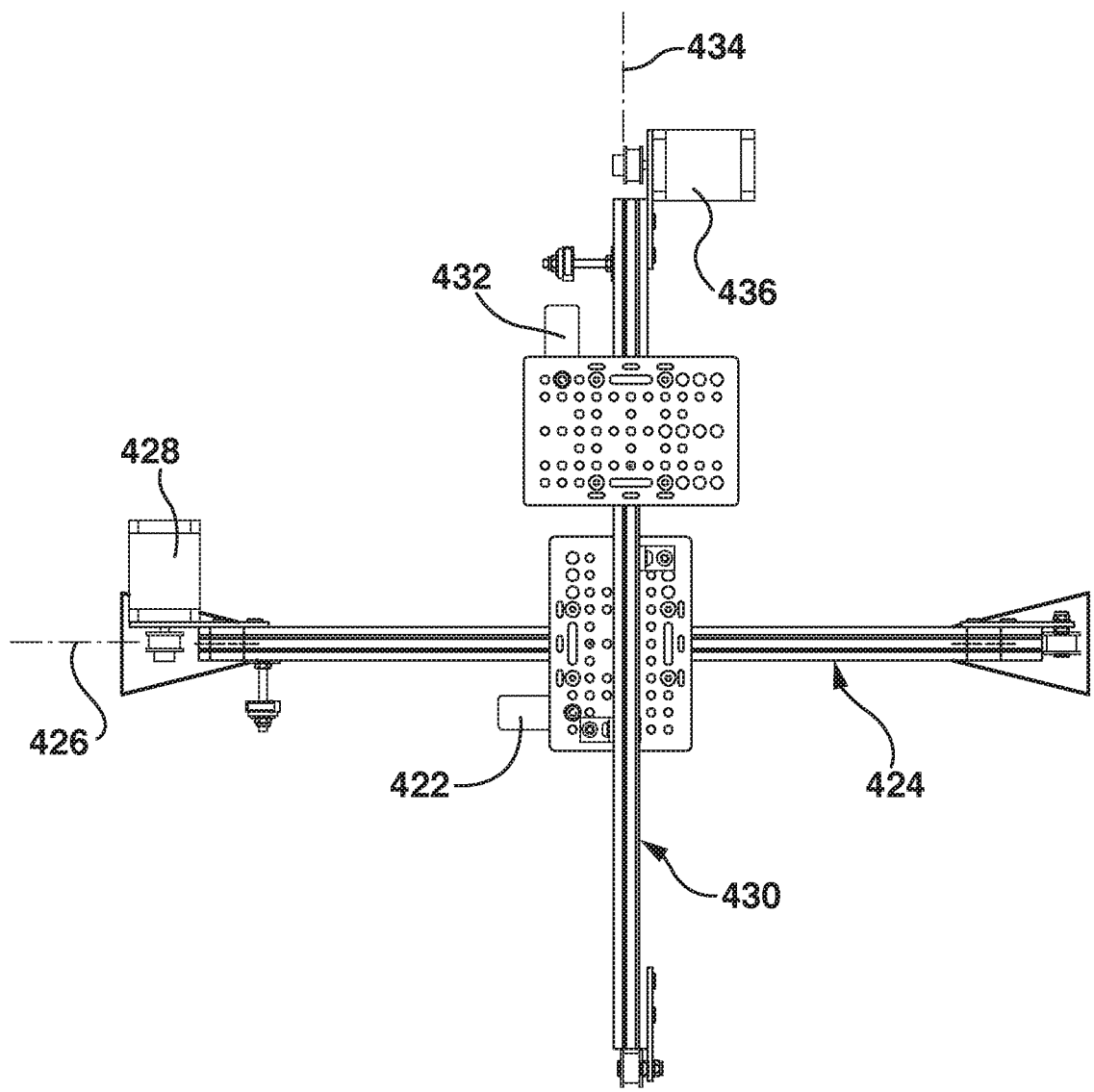
FIG. 14 is a top view of another portion of the vending machine of FIG. 11.
Figure 15:
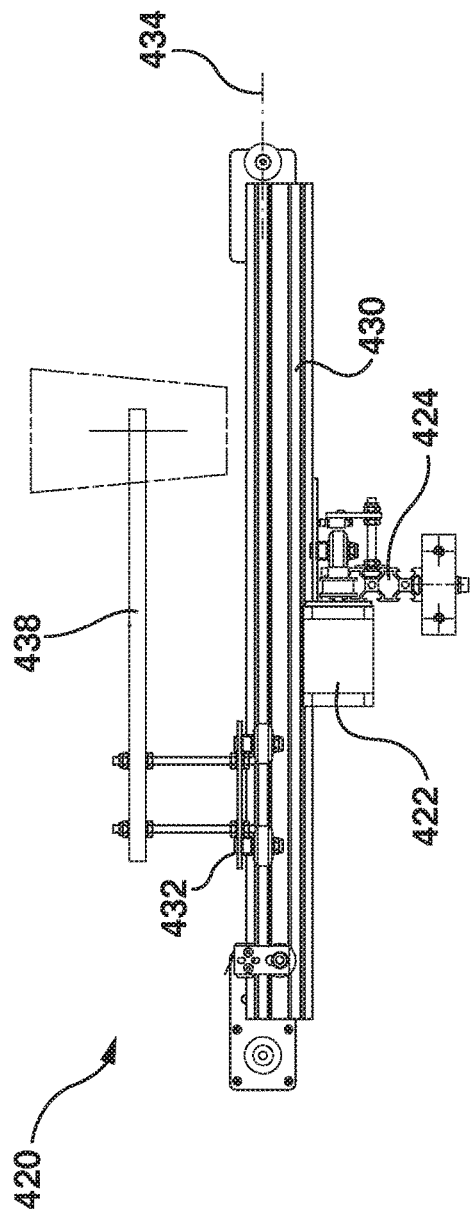
FIG. 15 is a side view of the portion of the vending machine of FIG. 14.
Figure 16:
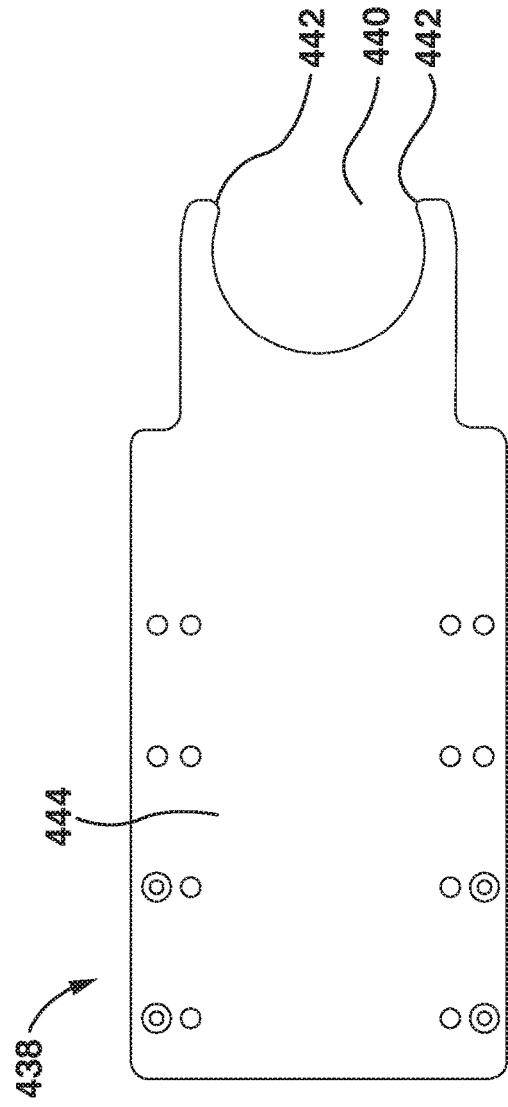
FIG. 16 is a top view of another portion of the vending machine of FIG. 9.

Referring also to FIGS. 14 to 16, in this example the receptacle transport unit 420 includes a two-axis transport system, having a lower carriage 422 that can slide on a lower rail 424 and can be driven along a lower axis 426 by a lower motor 428. The lower rail 424 can be secured to the housing of the vending machine 300. The transport unit 420 also includes an upper rail 430 that is mounted to the lower carriage 422, and an upper carriage 432 that can slide axially on the upper rail 430, along an upper axis 434, and can be driven by an upper motor 436. In this arrangement, the axes 426 and 434 are generally orthogonal to each other.

A receptacle holder 438 is mounted to the upper carriage 432, and can move with the upper carriage 432. The receptacle holder 438 has a base 444 that can be connected to the upper carriage 432, and an open recess 440 at one end, that is at least partially bounded by retaining fingers 442.

The retaining fingers 442 can be configured to help retain a receptacle 308 in the recess 440 while the transport unit 420 is in use. Optionally, the retaining fingers 442 may be resiliently flexible, such that they can retain the receptacle 308 while the vending machine 300 is in use, but can also allow a user to remove the receptacle 308 laterally from the recess by pulling the receptacle 308 and deflecting the fingers 442. Alternatively, portions of the fingers 442 may be pivotally or otherwise movably connected to the base 444 and may be openable and closeable, for example using a suitable motor and spring assembly, to selectably retain and release the receptacle 308.

Optionally, the receptacle holder 438 can be configured to release the receptacle 308 from the recess 440 without requiring the user to grasp or otherwise engage the receptacle 308. This may allow the transport unit 420 to deposit a receptacle 308 in a desired location, such as a delivery station, and then leave the receptacle 308 to be picked-up by a user at a later time.

Figure 22:
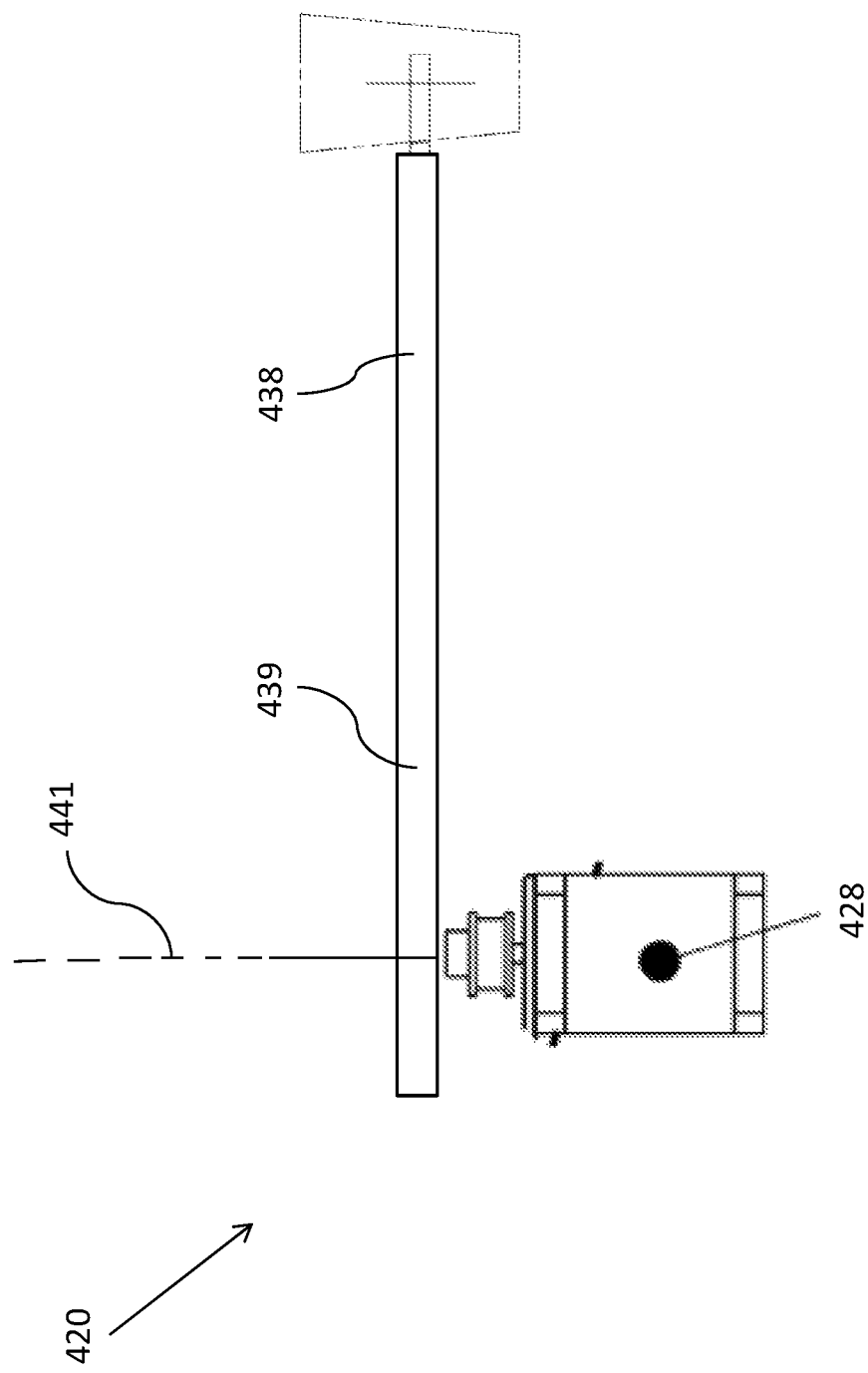
FIG. 22 is a side view of another embodiment of a receptacle transport unit.
Figure 23:
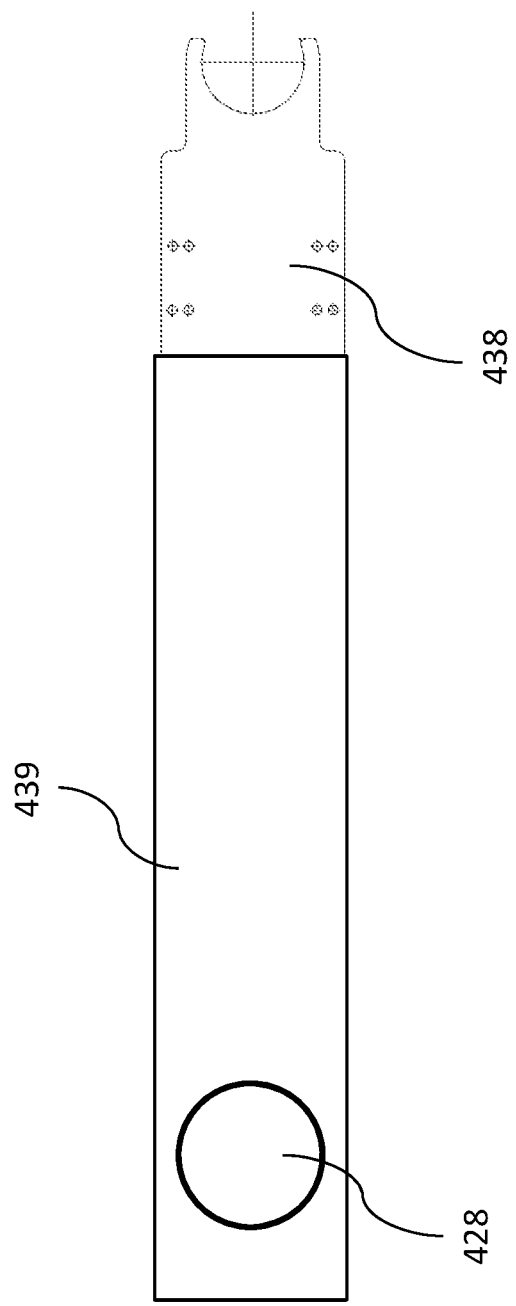
FIG. 23 is a bottom view of the receptacle transport unit of FIG. 22.

Referring to FIGS. 22 and 23, an alternative embodiment of a receptacle transport unit 420, in which the receptacle holder 438 is rotated, rather than linearly translated in the two-axis transport system. In this embodiment, the transport unit 420 includes an arm 439 that is rotatable about a rotation axis 441 and is driven by a motor 428. The receptacle holder 438 is mounted to the arm 439 and can rotate with it. In this arrangement, the receptacle holder 438 can be rotated between the receptacle dispenser, heating assembly, condiment dispenser, and delivery station Optionally, the delivery station may be arranged to inhibit a user's access to the interior of the vending machine 300 when in use. For example, the delivery station may have double, air-lock type doors, a rotary table with a divider or other such constructions that may allow a receptacle 308 to be transferred from the interior of the vending machine 300 to a region where it can be grasped by the user, but without providing direct physical access to the interior.

In the vending machine 300, the granular foodstuffs are heated using hot water, as an alternative to using steam as in the vending machines 100 and 200 as illustrated. Using hot water, instead of steam, may help simplify one or more aspects of the vending machine 300 because, for example the vending machine 300 need not include a steam generator or other apparatus for producing steam. The use of hot water may, in some configurations, help reduce the energy input required to heat the foodstuffs, as the vending machine 300 does not need to provide the energy required water to change the phase of the heating fluid (i.e. boil water to form steam).

In any of the above examples, the vending machine may include a PLC for controlling operation of the vending machine. As mentioned above, the PLC may be configured to initiate the dispensing operation upon receipt of payment at a payment station of the machine. For example, the vending machine 300 includes system controller that has a user input 446 (FIG. 10) that can allow a machine operator to set a desired temperature for the water used to heat the granular foodstuffs, as well as the timing of the heating process, the amount of water used, the amount of the condiments to be dispensed per order and other machine related functions.

Optionally, the vending machine 300 (or 100 or 200) may include two or more heating assemblies 312, and the heating assemblies may, in some configurations, be independently operable. Providing two or more heating assemblies 312 arranged in parallel with each other may help reduce the amount of time it takes to prepare two or more servings of the heated corn kernels. In such an arrangement, each heating assembly 312 may be configured to receive only a single serving of the granulated foodstuffs, and multiple orders by a single user can be accommodated by utilizing additional heating assemblies 312. The heating assemblies 312 may be configured to receive the granulated foodstuffs from a common source, such as chute 330, but providing any suitable conduits, valves and other flow directing members (such as a forked conduit an a valve that can selectably direct the foodstuffs into one of two separate heating assemblies 312).

Optionally, the vending machine 300 may be configured to heat its entire contents of granulated foodstuffs to a desired temperature, and maintain the entire batch at the temperature for the duration of an operation period (such as one day). For example, the storage hopper 302 may be operated as a large-scale steam chamber that keeps all of the corn at approximately its service temperature. Alternatively, the vending machine 300 may include a bulk heating assembly that is separate from the storage hopper 302. For example, a bulk heating assembly may be configured to store one days' worth of the foodstuff, while the storage hopper 302 may store several days' worth. In this arrangement, it may be desirable to keep the storage hopper 302 cold to help preserve the foodstuffs, and to only pre-heat one days' worth of foodstuffs at a given time. If the storage temperature of is acceptable as a serving temperature, the vending machine 300 may by-pass the secondary heating assembly 312 and dispense the heated corn directly from the storage hopper 302 or bulk heating assembly into the receptacles 308. Alternatively, the storage temperature may be below the serving temperature, such that individual portions of the corn are still heated in the heating assembly 312 as described herein, but the time required for the heating cycle is reduced because the corn is effectively pre-heated in the storage hopper 302 or bulk heating assembly before entering the final heating stage. This may help reduce the overall dispensing time per serving of granular foodstuff.

Optionally, the vending machine 300 may be configured to automatically dispose of any such bulk or pre-heated granular foodstuffs after a given storage time. For example, for freshness, food safety or other such concerns, the vending machine 300 may be configured to automatically empty the heated storage hopper 302 or bulk heating assembly, by directing its contents to a waste receptacle, if the contents have been stored at an elevated temperature for more than a pre-set storage time period, such as more than about 1, 2, 3, 4, 5, 6, 7, 8, 9, 10, 11 or 12 hours or more.

Optionally, instead of using the primary storage hopper 302 as a batch heating apparatus, the vending machine 300 may include at least one intermediary hopper located downstream from the storage hopper 302 and upstream form the heating assembly 312. The intermediary hopper may be sized to accommodate a batch of granular foodstuffs that is less than the entire capacity of the storage hopper 302, but more than the capacity of a given heating pot 336, and to pre-heat the batch in the manner described herein. For example, while the storage hopper 302 may be configured to hold 50, 100 or more servings of the granular foodstuffs, the intermediary hopper may contain 10 servings or less. That is, the storage hopper 302 may be configured to store about one week's worth of food, while the intermediately hopper is designed to store and pre-heat about one day's worth. This may allow the storage hopper 302 to be maintained a fridge or freezer-like conditions (i.e. at a first condition) to preserve a quantity of granular foodstuffs for a longer time period, while also allowing a batch of foodstuffs to be heated in the associated intermediary hopper that is maintained at a pre-heating, elevated temperature (i.e. at a different, second condition). Alternatively, the vending machine 300 may be configured to utilize a two-stage dispensing system using both a freezer compartment and a refrigerator compartment. In such embodiments, the storage hopper 302 may be operated as a freezer to store several days' worth of the foodstuff, and the intermediary hopper and/or other holding container may be configured as a refrigerator, and to hold about one day's worth of foodstuffs. In these embodiments, the intermediary hopper can hold the foodstuffs at refrigerator temperatures as it thaws (having exited the freezer in the storage hopper 302), but need not apply heat to the foodstuffs. This may allow one day's worth of food to be kept in a non-frozen state (which may help speed up the cooking/heating time) while helping to preserve the freshness of the foodstuffs (as compared to pre-heating or storing the foodstuffs at an elevated temperature).

Optionally, a vending machine may be configured such that it does not include a receptacle/cup dispenser. For example, instead of an automated the receptacle dispensing assembly 306 and/or a cup dispensing unit 418, a vending machine may be arranged so that a user can provide the cup or other container for holding the heated foodstuffs. For example, the vending machine may prompt the user to insert a suitable cup into the machine, and may then use a suitable transport unit (such as unit 420) to move the cup to the heating assembly 318 to receive heated food, and to the condiment dispenser 360 to receive condiments before returning the cup to the user. Alternatively, the vending machine may prompt the user to insert a suitable cup into the machine, and may then use a suitable transport unit (such as unit 420) to move the cup to the heating assembly 318 to receive heated food, but may not require an automated condiment dispenser 360. Instead, condiments may be dispensed separately to the user, such as in a separate cup, via individual packages/packets (such as a small pouch of salt and a small pouch of olive oil) or the like. This may help allow the machine to use different sized cups, without having to be able to fit all types of cups to the condiment dispenser.

In yet another example, the outlet from the heating assembly 318, and optionally one or more of the outlets 365 of the condiment dispenser 360, may be accessible to the user from outside the vending machine 300. This may allow a user to hold a cup or other receptacle beneath the heating assembly outlets to receive the heated foodstuffs, then manually move the cup beneath one or more of the condiment outlets 365 to receive the selected condiments.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

The invention claimed is:

1. A vending machine for dispensing heated granular foodstuffs to a customer, the vending machine comprising:
   a) a cooled storage hopper for storing granular foodstuffs;
   b) a discharge assembly configured to dispense a first quantity of granular foodstuffs from the storage hopper;
   c) a heating assembly for receiving the first quantity of granular foodstuffs from the discharge assembly and to heat the first quantity of granular foodstuffs to a serving temperature;
   d) a receptacle transport unit configured to receive a receptacle, transport the receptacle to the heating assembly to receive the first quantity of granular foodstuffs, and transport the receptacle containing the first quantity of granular foodstuffs to a delivery station whereby the receptacle containing the first quantity of the granular foodstuffs is accessible to a customer.

2. The vending machine of claim 1, further comprising:
   a condiment dispenser operable to dispense at least one condiment onto the first quantity of granular foodstuffs contained in the receptacle, and wherein the receptacle transport unit is operable to transport the receptacle containing the first quantity of granular foodstuffs from the heating assembly to the condiment dispenser to receive the at least one condiment prior and then to transport the receptacle containing the first quantity of granular foodstuffs to the delivery station; and/or
   a first condiment container for storing a first condiment and in communication with a first condiment outlet for dispensing the first condiment, and preferably a second condiment container for storing a second condiment that is different than the first condiment and in communication with a second condiment outlet.

3. The vending machine of claim 2,
   wherein the first condiment container is maintained at a first temperature and the second condiment container is maintained at a different, second temperature;
   wherein the receptacle containing the first quantity of granular foodstuffs is positionable beneath the first condiment outlet and the second condiment outlet to simultaneously receive the first condiment and the second condiment; and/or
   wherein the condiment dispenser further comprises
      i) a first condiment application station comprising the first condiment outlet and
      ii) a second condiment application station spaced apart from the first condiment station and comprising the second condiment outlet,
   and the receptacle transport unit is operable to move the receptacle containing the first quantity of the granular foodstuffs to the first condiment station to receive the first condiment from the first condiment outlet and to the second condiment station to receive the second condiment from the second condiment outlet, and wherein when the receptacle is in the second condiment station it is spaced apart from the first condiment outlet and cannot receive the first condiment.

4. The vending machine of claim 1, wherein the heating assembly further comprises:
   e) a heating pot having a top opening configured to receive the first quantity of granular foodstuffs from the discharge, a sidewall extending axially from the top opening and an opposing bottom opening;
   f) a porous bottom wall positionable to cover the bottom opening in the heating pot to retain the first quantity of granular foodstuffs within the heating pot;
   g) a heating fluid applicator for dispensing a flow of heating fluid into the heating pot whereby the first quantity of granular foodstuffs is heated optionally to the serving temperature by the flowing heating fluid preferably comprising at least one of steam and liquid water; and
      wherein the heating fluid applicator preferably comprises spray nozzle configured to spray the flow of heating fluid into the top opening of the heating pot and the heating fluid exits via the bottom opening and travels through the porous bottom wall to a drain.

5. The vending machine of claim 4, wherein the heating fluid applicator comprises at least a first inlet port provided in the sidewall of the heating pot and spaced axially between the top opening and bottom opening, through which the heating fluid can be introduced into the heating pot optionally wherein the heating assembly further comprises at least one internal sprayer extending inwardly from the first inlet port inside the heating pot and positioned so as to be surrounded by the first quantity of granular foodstuffs when in use, the internal sprayer including a plurality of outlet holes to dispense the heating fluid within the heating pot.

6. The vending machine of claim 4, wherein the heating pot is movable between:
   a first position, in which the top opening underlies an outlet of the discharge assembly to receive the first quantity of granular foodstuffs;
   a second position, in which the heating pot can receive the flow of heating fluid and the bottom opening overlies the porous bottom wall, and
   a third position, in which the bottom opening is spaced apart from the bottom wall and overlies the receptacle whereby the first quantity of granular foodstuffs that has been heated is transferred from the heating pot to the receptacle.

7. The vending machine of claim 6, wherein the heating assembly further comprising a washing station that is operable to wash the heating pot between uses with a washing liquid, and wherein the heating pot is movable from the third position to a fourth position in the washing station to be washed, and then from the fourth position to the first position to receive a second quantity of the granular foodstuffs and wherein the vending machine further comprising a drip tray extending beneath at least the washing station and the second position to receive the heating fluid exiting the heating pot via the bottom opening and used washing liquid.

8. The vending machine of claim 1, wherein the cooled storage hopper is provided at a higher elevation than the heating assembly, whereby the first quantity of granular foodstuffs can be conveyed from the cooled storage hopper to the heating assembly via gravity.

9. A vending machine for dispensing heated granular foodstuffs, comprising:
   a) a cooled storage hopper for storing granular foodstuffs;
   b) a receptacle dispensing assembly for dispensing a receptacle into a receiving zone;
   c) a heating assembly for heating a quantity of the granular foodstuffs received from the cooled storage hopper and dispensing the quantity of the granular foodstuffs into the receptacle in the receiving zone; and d) a discharge assembly for transporting the quantity of the granular foodstuffs from the cooled storage hopper to the heating assembly, wherein the cooled storage hopper preferably comprises an open bottom end, and the discharge assembly is in communication with the open bottom end; and the vending machine preferably further comprising a drain assembly for draining heating fluid from the heating assembly.

10. The vending machine of claim 9, wherein the discharge assembly comprises:
   i) a discharge chamber adjacent the open bottom end;
   ii) a discharge actuator in the discharge chamber, the discharge actuator comprising a discharge pocket having a discharge pocket top opening and a discharge pocket bottom opening.

11. The vending machine of claim 10, wherein the discharge assembly further comprises a first chute laterally spaced from the open bottom end, and the discharge actuator is laterally slideable in the discharge chamber between a first position wherein the discharge pocket is aligned with the open bottom end and a second position wherein the discharge pocket is aligned with the first chute and the discharge actuator preferably blocks the open bottom end.

12. The vending machine of claim 11, wherein the heating assembly comprises:
   i) a heating chamber below the first chute;
   ii) a second chute in communication with the heating chamber and laterally spaced from the first chute, wherein the second chute is preferably vertically aligned with the receiving zone;
   iii) a heating fluid inlet in the heating chamber between the first chute and the second chute; and
   iv) a heating actuator in the heating chamber, the heating actuator comprising a heating pocket having a heating pocket top opening for receiving the quantity of the granular foodstuffs from the first chute, and a heating pocket bottom opening for dispensing the quantity of the granular foodstuffs into the second chute, and optionally wherein the heating actuator is laterally slideable in the heating chamber amongst a first position wherein the heating pocket top opening is aligned with the first chute, a second position wherein the heating pocket is aligned with the heating fluid inlet, and a third position wherein the heating pocket bottom opening is aligned with the second chute.

13. The vending machine of claim 11, wherein the heating assembly comprises a heating vessel vertically aligned with the first chute, the heating vessel having a heating fluid inlet and optionally a heating vessel openable bottom, the heating vessel openable bottom vertically aligned with the receiving zone.

14. The vending machine of claim 9, further comprising a condiment dispenser for dispensing at least one condiment into the receptacle in the receiving zone.

15. The vending machine of claim 9 further comprising:
   e) a heating fluid generator for supplying heating fluid to the heating assembly;
   f) a drain assembly for draining heating fluid from the heating assembly; and
   g) a condiment dispenser for dispensing at least one condiment into the receptacle in the receiving zone,
   wherein the cooled storage hopper for storing granular foodstuffs has an open bottom end;
   wherein the discharge assembly is in communication with the open bottom end for transporting a quantity of the granular foodstuffs away from the cooled storage hopper; and
   wherein the heating assembly is for receiving the quantity of the granular foodstuffs from the discharge assembly, heating the quantity of the granular foodstuffs with a heating fluid, and dispensing the quantity of the granular foodstuffs into the receptacle in the receiving zone.

16. The vending machine of claim 9, further comprising a receptacle transport unit configured to receive a receptacle, transport the receptacle to the heating assembly to receive the first quantity of granular foodstuffs, and transport the receptacle containing the first quantity of granular foodstuffs to a delivery station whereby the receptacle containing the first quantity of the granular foodstuffs is accessible to a customer.

17. The vending machine of claim 9, further comprising a receptacle transport unit including an arm configured to rotate about a vertical axis and a receptacle holder mounted to the arm, wherein the arm is configured to rotate the receptacle holder to:
   a first position to receive a receptacle,
   a second position to transport the receptacle to the heating assembly to receive the first quantity of granular foodstuffs,
   a third position to transport the receptacle to the condiment dispenser to receive the dispensed condiment, and
   a fourth position to transport the receptacle containing the first quantity of granular foodstuffs and the dispensed condiment to a delivery station whereby the receptacle is accessible to a customer.

18. A method for dispensing heated granular foodstuffs, the method comprising:
   a) cooling granular foodstuffs;
   b) dispensing a receptacle into a receiving zone;
   c) discharging a quantity of the cooled granular foodstuffs;
   d) heating the quantity of the cooled granular foodstuffs; and
   e) dispensing the quantity of the heated granular foodstuffs into the receptacle in the receiving zone.

19. The method of claim 18, wherein the granular foodstuffs comprise kernels of corn and the method preferably further comprising applying a condiment to the receptacle in the receiving zone.

20. The method of claim 18, wherein step d) comprises applying a heating fluid to the cooled granular foodstuffs, wherein the heating fluid is preferably hot water or steam and the method preferably further comprising draining the heating fluid from the heated granular foodstuffs.

* * * * *